(12) United States Patent  
Tobata

(10) Patent No.: US 7,237,640 B2
(45) Date of Patent: Jul. 3, 2007

(54) VEHICLE SEAT BELT APPARATUS

(75) Inventor: Hideo Tobata, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 270 days.

(21) Appl. No.: 10/892,188

(22) Filed: Jul. 16, 2004

(65) Prior Publication Data

US 2005/0012320 A1  Jan. 20, 2005

(30) Foreign Application Priority Data

Jul. 18, 2003 (JP) ............................. 2003-276742

(51) Int. Cl.
    B60R 21/00 (2006.01)
(52) U.S. Cl. .................. 180/268; 280/806; 280/807
(58) Field of Classification Search ............. 180/268; 280/805, 806, 807, 801.1; 242/390.8
    See application file for complete search history.

(56) References Cited

U.S. PATENT DOCUMENTS

| 4,455,000 | A | * | 6/1984 | Nilsson ...................... 242/374 |
| 4,487,381 | A | * | 12/1984 | Kubota ...................... 242/375.3 |
| 4,534,441 | A | * | 8/1985 | Kamijo et al. .............. 180/268 |
| 5,605,202 | A | | 2/1997 | Dixon |
| 6,427,935 | B1 | * | 8/2002 | Fujii et al. ................ 242/390.9 |
| 6,485,057 | B1 | | 11/2002 | Midorikawa et al. |
| 7,029,032 | B2 | * | 4/2006 | Bullinger et al. ........... 280/806 |
| 2001/0045483 | A1 | * | 11/2001 | Tanaka et al. ............ 242/390.9 |
| 2001/0054816 | A1 | | 12/2001 | Brambilla et al. |
| 2002/0011537 | A1 | * | 1/2002 | Durstein et al. ......... 242/390.8 |
| 2002/0024211 | A1 | * | 2/2002 | Yano et al. ................. 280/806 |
| 2003/0209900 | A1 | * | 11/2003 | Tobata ........................ 280/807 |
| 2004/0108697 | A1 | * | 6/2004 | Midorikawa et al. ....... 280/735 |

FOREIGN PATENT DOCUMENTS

JP  2000-177535 A  6/2000

* cited by examiner

Primary Examiner—Paul N. Dickson
Assistant Examiner—Tiffany L. Webb
(74) Attorney, Agent, or Firm—Foley & Lardner LLP

(57) ABSTRACT

A vehicle seat belt apparatus includes a reel to wind a seat belt, a motor to control a belt tension of the seat belt by rotating the reel, and a lock section to allow rotation of the reel in a normal state, and to prevent rotation of the reel in a belt extracting direction in an actuated state. A control section is provided to restrict a lock operation of the lock section by rotating the motor in a belt retracting direction when the belt tension is controlled by the motor.

23 Claims, 21 Drawing Sheets

VEHICLE SEAT BELT APPARATUS

BACKGROUND OF THE INVENTION

The present invention relates to technique of controlling a seat belt for a vehicle.

A Published Japanese Patent Application Kokai No. 2000-177535 shows a seat belt system to restrain an occupant securely by providing a constant belt tension with a spring, and locking the seat belt against extraction with a lock mechanism in case of emergency. This seat belt system controls a seat belt tension in accordance with a vehicle condition, with a belt retracting motor.

SUMMARY OF THE INVENTION

When the seat belt is retracted by the motor in the lock state of the lock mechanism in this seat belt system, the belt tension is increased by the motor, and held in the increased state by the lock mechanism even after an end of the belt retracting operation of the motor. Even after the vehicle deceleration or turning operation ends, and hence the belt locking is needed no longer, the lock mechanism is held, by the effect of the belt tension, in the lock state in which a locking claw and a locking gear are engaged.

It is an object of the present invention to provide apparatus and/or method for controlling a belt tension of a seat belt adequately.

According to one aspect of the present invention, a vehicle seat belt apparatus comprises: a reel to wind and store a seat belt; a motor to control a belt tension of the seat belt by rotating the reel; a lock section to allow rotation of the reel in a normal state, and to prevent rotation of the reel in a belt extracting direction in an actuated state; and a control section to restrict a lock operation of the lock section by rotating the motor in a belt retracting direction when the belt tension is controlled by the motor.

According to another aspect of the invention, a vehicle seat belt tension control method comprises: a first method element of detecting a vehicle state requiring restraint of an occupant in a vehicle; a second method element of performing an automatic belt retracting operation to retract a seat belt to restrain the occupant when the vehicle state requiring the restraint of the occupant is detected; and a third method element of holding a belt tension of the seat belt after the belt retracting operation by applying a force to the seat belt to retract the seat belt.

DETAILED DESCRIPTION OF THE INVENTION

Figure 1:
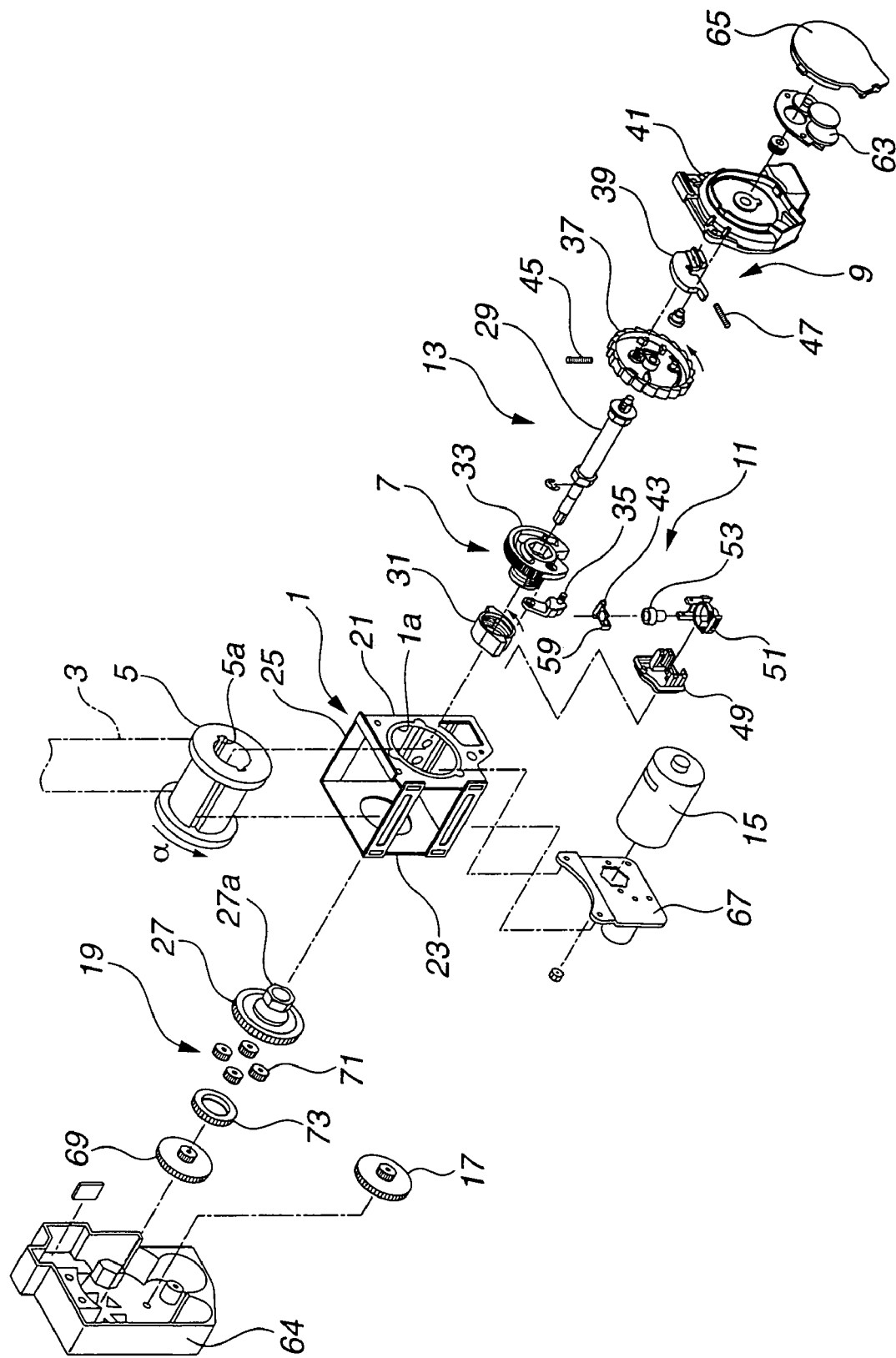
FIG. 1 is an exploded perspective view showing a vehicle seat belt apparatus according to a first embodiment of the present invention.
Figure 2:
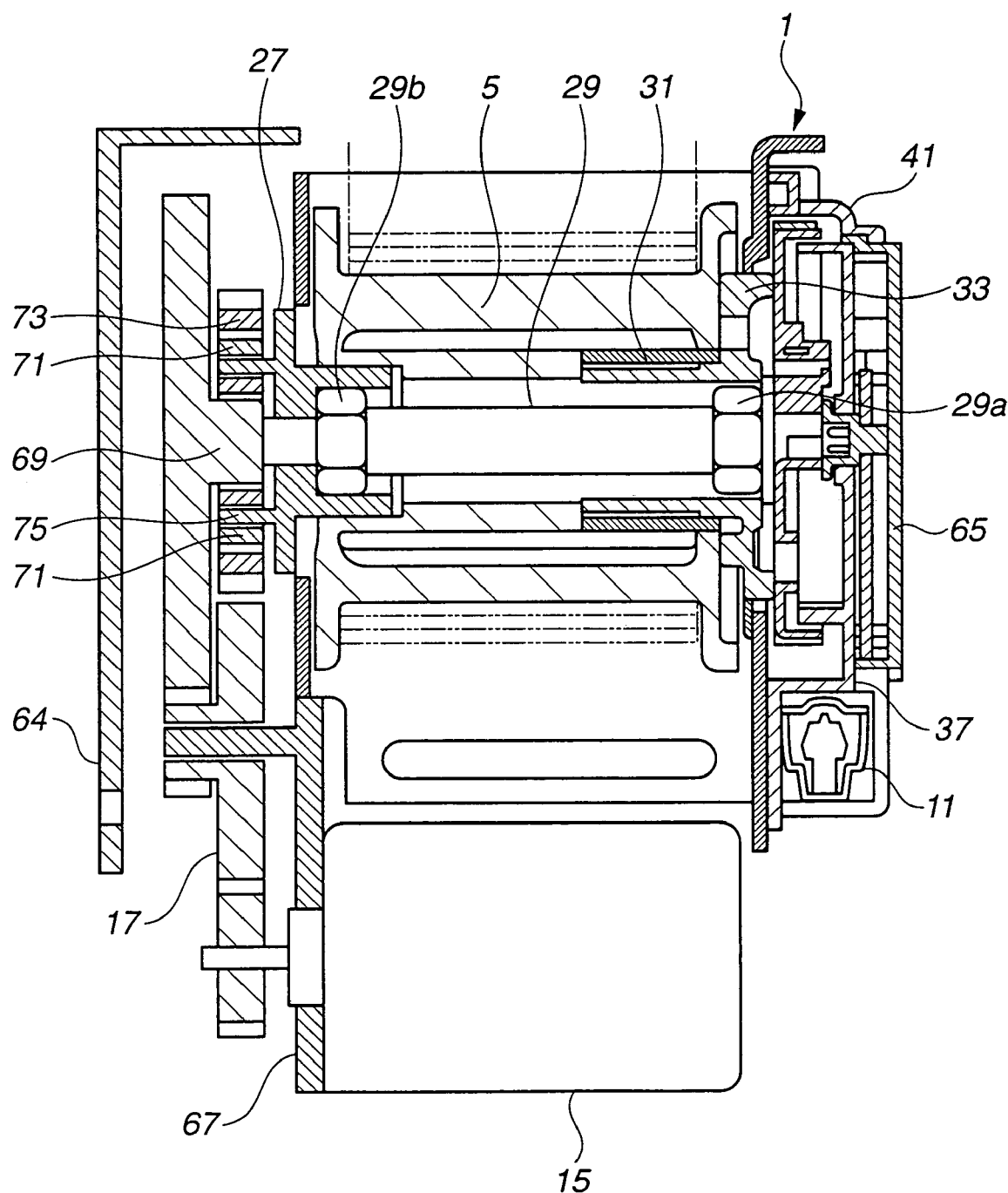
FIG. 2 is a sectional view showing the seat belt apparatus of FIG. 1 in the assembled state.

FIGS. 1~14 show a vehicle seat belt apparatus or system according to a first embodiment of the present invention. As shown in FIG. 1, the seat belt system includes a frame 1; a reel 5 for winding and storing a seat belt 3; a lock mechanism 7 disposed on a first side of frame 1 and arranged to prevent rotation of reel 5 in a belt extracting or payout direction a when actuated; a lock actuating mechanism 9 for actuating lock mechanism 7 in case of need; an acceleration sensing mechanism 11 for sensing an acceleration in acceleration or deceleration operation or cornering operation of the vehicle; a force limiter mechanism (or EA mechanism) 13 for limiting a load applied on seat belt 3 when lock mechanism 7 is actuated to prevent seat belt 5 from being pulled out in case of hard deceleration as in a vehicle collision; a motor 15 disposed on a second side of frame 1, for producing torque to take up seat belt 5; and a speed reduction mechanism including a reduction gear 17 and a planetary gear set 19, for transmitting torque of motor 15 to reel 5 at a reduced speed.

Frame 1 includes a pair of parallel side walls 21 and 23 and a back plate 25 connecting both side walls. Reel 5 is installed in frame 1, between side walls 21 and 23.

Reel 5 is formed with a center through hole 5a extending axially through reel 5. Through hole 5a has a first hole end portion located adjacent to side wall 23 and a second hole end portion adjacent to side wall 21 of frame 1. The first hole end portion of through hole 5a is shaped to have a cross sectional shape of a regular hexagon, and designed to fit over a hexagonal tubular shaft portion 27a of a shaft gear 27 to which a first end of a torsion bar 29 is fit. Reel 5, shaft gear 27 and torsion bar 29 rotate as a unit. The second hole end portion of through hole 5a has such a cross sectional shape as to fit over a stopper 31 to which a second end of torsion bar 29 is fit. Reel 5 and stopper 31 rotate as a unit.

Figure 3:
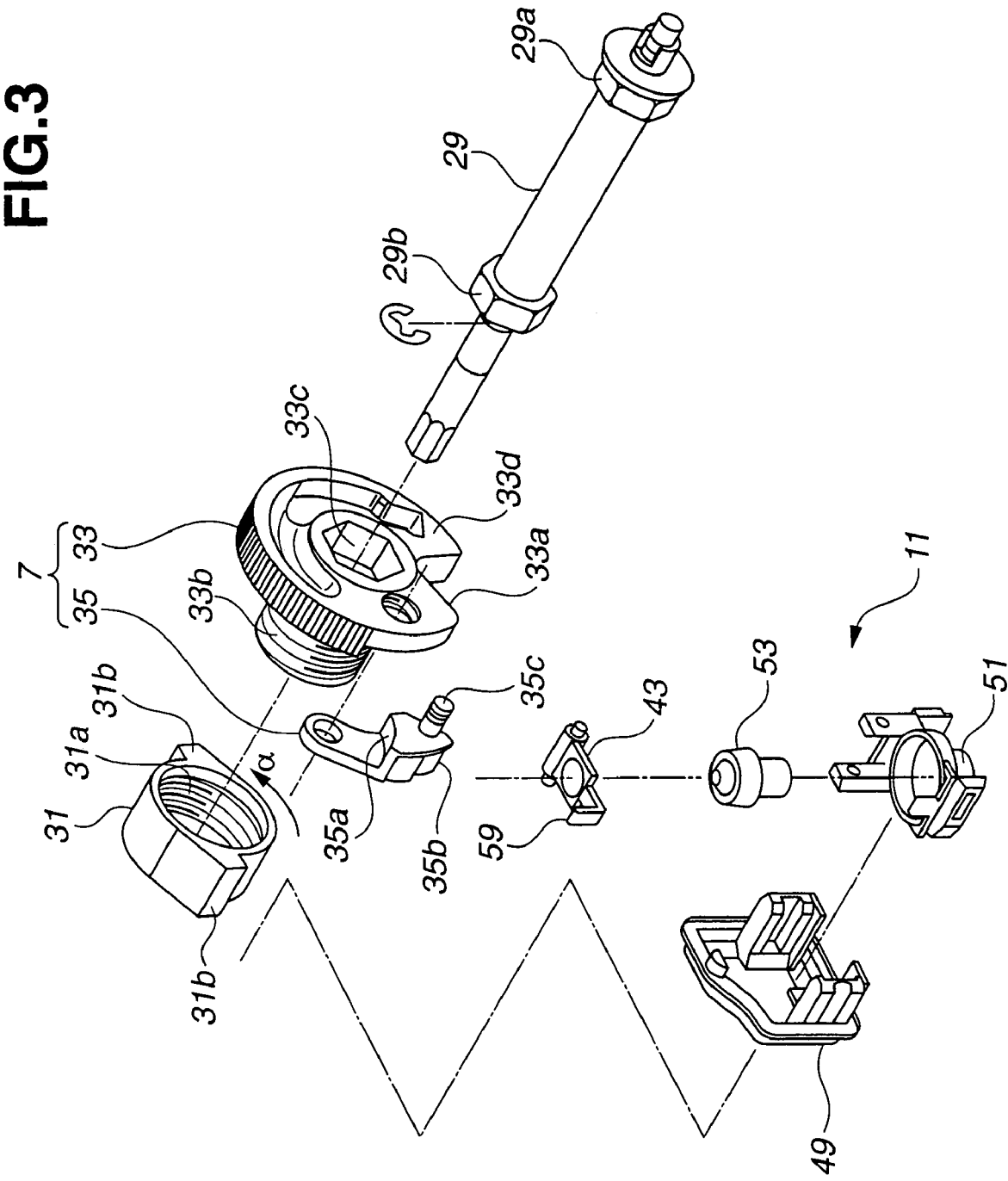
FIG. 3 is an exploded perspective view showing a lock mechanism of the seat belt apparatus of FIG. 1.

Lock mechanism 7 includes a locking base 33 and a pawl 35, as best shown in FIG. 3. Locking base 33 includes a portion supporting pawl 35 rotatably about an axis parallel to the rotation axis of reel 5, and a load receiving portion 33a shaped in the form of a circular arc around the rotation axis of pawl 35, so that a load from pawl 35 is received through load receiving portion 33a.

Pawl 35 includes an engaging claw 35b projecting downward from a lower portion of pawl 35, and a cam follower 35c in the form of a rod projecting in the axial direction. Engaging claw 35b is arranged to engage with and disengage from an internally toothed portion 1a formed in frame 1. When engaging claw 35b is engaged with internally toothed portion 1a of frame 1, a reaction force of pawl 35 is received by load receiving portion 33a of locking base 33.

Figure 4:
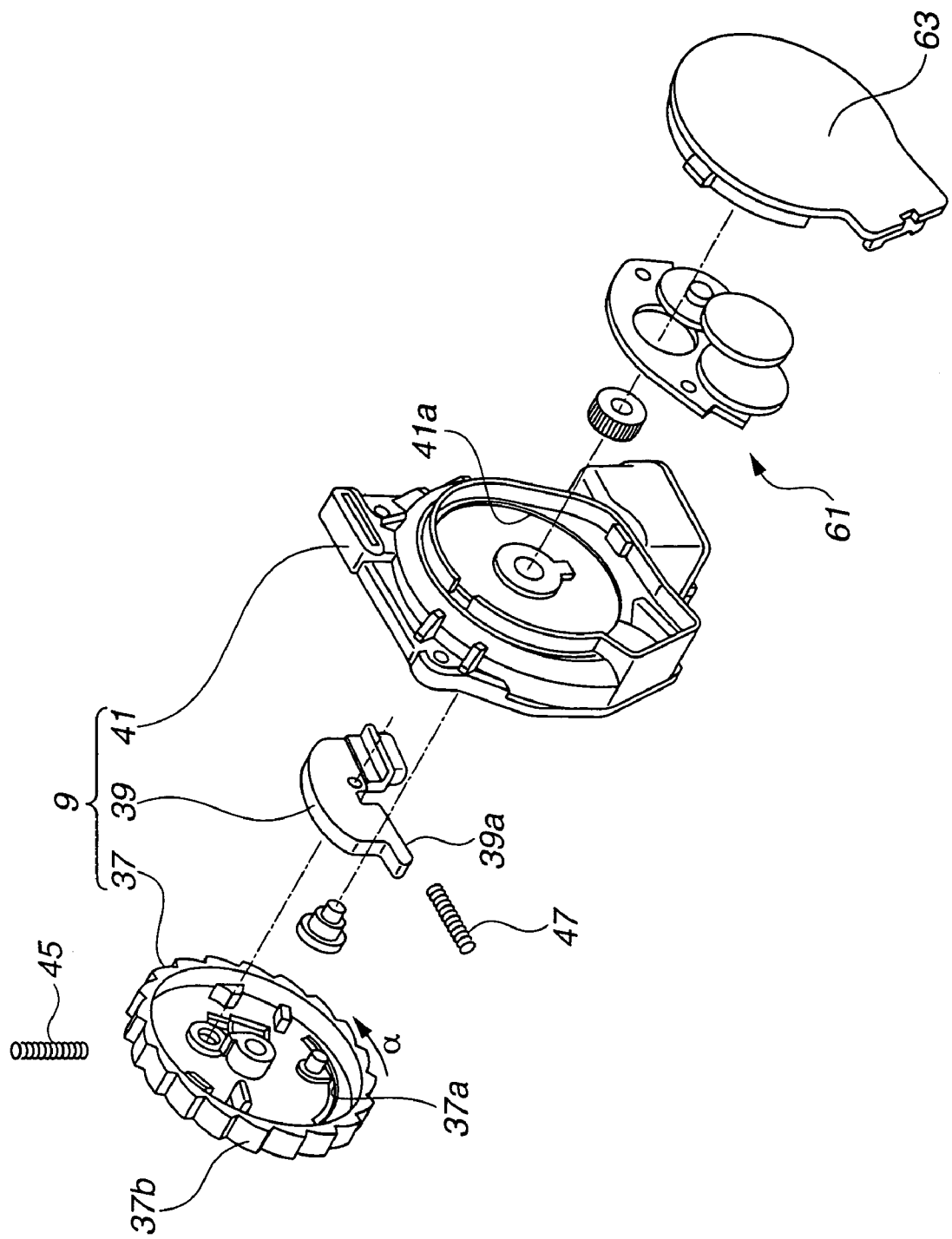
FIG. 4 is an exploded perspective view showing a lock actuating mechanism of the seat belt apparatus of FIG. 1.
Figure 5:
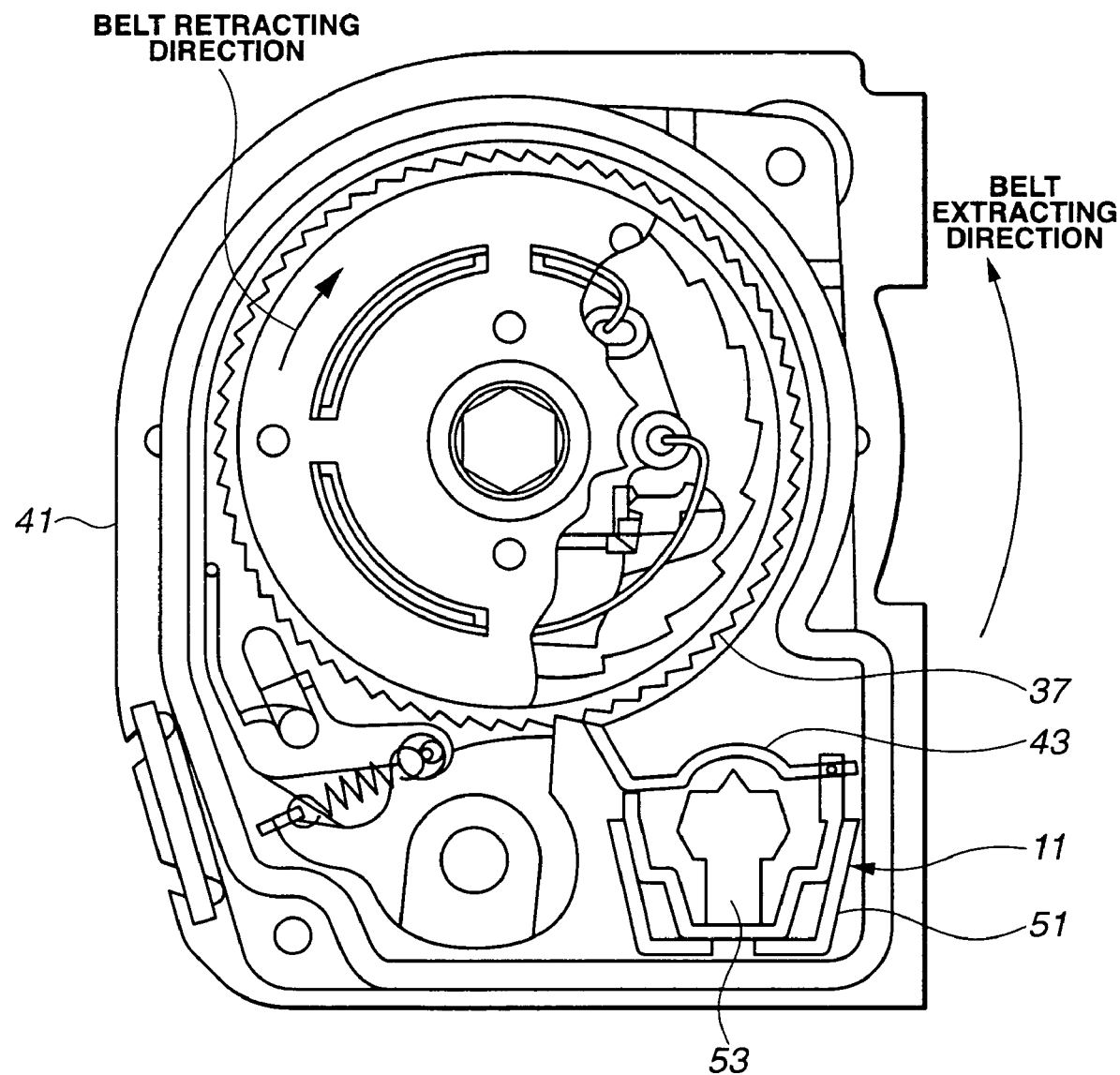
FIG. 5 is a side view showing the lock actuating mechanism in the assembled state as viewed from the right side in FIG. 4.

Lock actuating mechanism 9 includes a lock gear 37, a flywheel 39 and a retainer 41, as shown in FIGS. 4 and 5. Lock gear 37 is formed with an arc cam slot 37a slidably receiving cam follower 35c of pawl 35. When lock gear 37 rotates relative to locking base 33, cam follower 35c is guided by cam slot 37a, and pawl 35 rotates.

Lock gear 37 supports flywheel 39 rotatably. Flywheel 39 is formed with an engaging claw 39a which engages with and disengages from an internally toothed portion 41a of retainer 41 in accordance with rotation of flywheel 39. Moreover, lock gear 37 has an externally toothed outer periphery or ratchet 37b formed with ratchet teeth. An actuator 43 of acceleration sensing mechanism 11 shown in FIG. 3 is arranged to engage with this ratchet 37b of lock gear 37 to lock the rotation of lock gear 37 in the belt extracting or payout direction alpha.

A pawl spring 45 shown in FIGS. 1 and 4 is disposed under compression between locking base 33 and lock gear 37, and arranged to urge lock gear 37 to the belt extracting direction alpha with respect to locking base 33. A flywheel spring 47 is disposed under compression between lock gear 37 and flywheel 39, and arranged to urge flywheel 39 in the belt extracting direction alpha with respect to lock gear 37.

Acceleration sensing mechanism 11, as shown in FIG. 3, includes a housing 49; a sensor case 51 installed in this housing 49; an inertia mass 53 mounted on this sensor case 51; and the before-mentioned actuator 43.

Figure 6A:
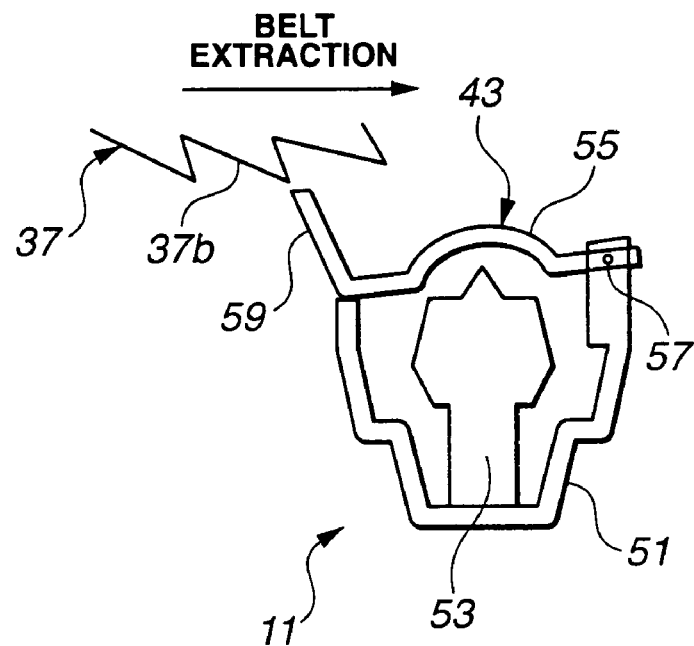
FIGS. 6A and 6B are views showing an acceleration sensing mechanism in the seat belt apparatus of FIG. 1 in a normal state (FIG. 6A) and in an actuated state (FIG. 6B) due to vehicle acceleration/deceleration or turning.
Figure 6B:
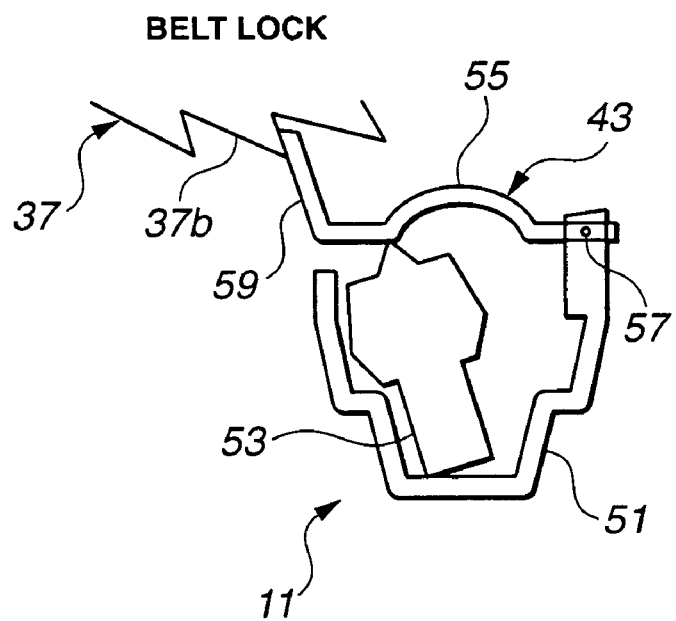
Figure 7A:
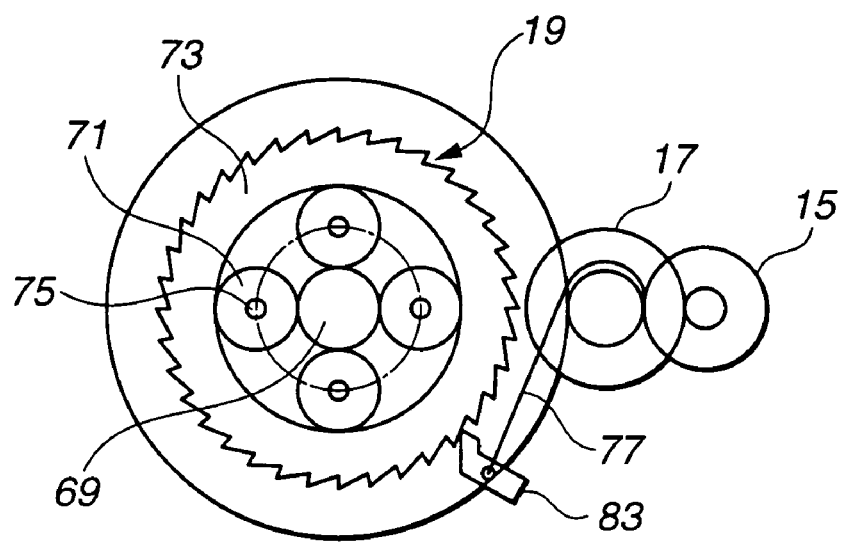
FIGS. 7A and 7B are front view and plan view showing a motor torque transmitting mechanism in the seat belt apparatus of FIG. 1.
Figure 7B:
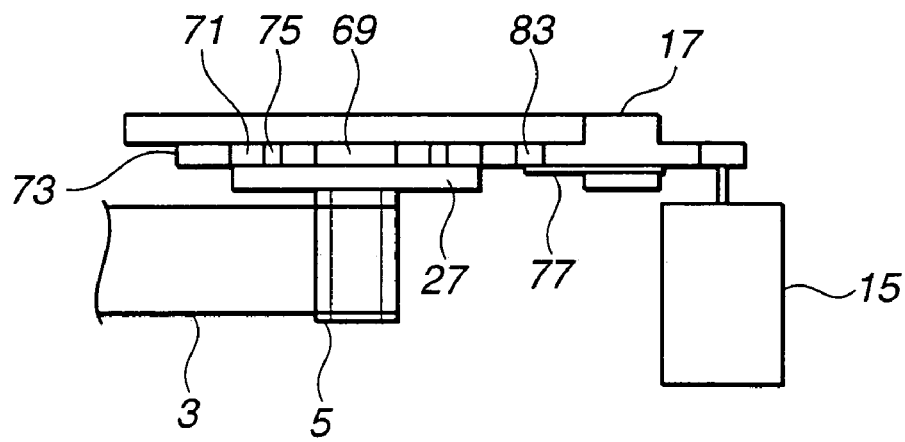

Housing 49 supporting sensor case 51 is fit in an opening of side wall 21 of frame 1, and thus fixed to frame 1. Sensor case 51 encases inertia mass 53, and supports actuator 43 rotatably. Inertia mass 53 normally stands upright as shown in FIG. 6A. When acceleration/deceleration or centripetal acceleration of a magnitude greater than or equal to a set level acts on the vehicle, inertia mass 53 inclines as shown in FIG. 6B, and rotates actuator 43.

Actuator 43 includes a pushed portion 55 to be pushed by inertia mass 53; a base portion 57 serving as a rotation shaft about which actuator 43 can rotate; and an engaging claw or projection 59 located opposite the base portion 57 across the pushed portion 55, and arranged to engage with lock gear 37. In a normal state as in a constant speed straight ahead driving operation, inertia mass 53 stands upright as shown in FIG. 6A, actuator 43 is in a lower position and hence engaging claw 59 is in an disengaged position disengaged from lock gear. When inertia actuator 53 inclines as in an accelerating/decelerating operation or a cornering operation, actuator 43 is rotated upward as shown in FIG. 6B and engaging claw 59 engages with external ratchet teeth portion 37 of lock gear 37. Thus, at least the lock gear 37 and engaging claw 59 form a locking mechanism or means. At least lock mechanism 7 and lock actuating mechanism 9 form a lock section to allow rotation of reel 5 in a normal state, and to prevent rotation of reel 5 in the belt retracting direction when actuated.

When the vehicle receives a deceleration greater than the predetermined level, inertia mass 53 inclines forward toward the front of the vehicle in acceleration sensing mechanism 11 and thereby causes actuator 43 to rotate to the position in which engaging claw 59 engages with the external ratchet teeth portion 37b of lock gear 37. In this case, however, the seat occupant moves forward by an inertial force, and applies, to the seat belt, a force to pull out the seat belt. Therefore, reel 5, torsion bar 29, locking base 33 and lock gear 37 try to rotate in the belt extracting or payout direction alpha (shown in FIG. 1). However, engaging claw 59 of actuator 43 engages with the external ratchet teeth portion 37b of lock gear 37, and thereby prevents the rotation of lock gear 37 in the belt extracting direction alpha. Consequently, reel 5, torsion bar 29 and locking base 33 rotate in the belt extracting direction alpha, excepting lock gear 37.

Therefore, there is produced a relative rotation between locking base 33 and lock gear 37; and pawl 35 of lock mechanism 7 rotates, so that the engaging projection 35b of pawl 35 engages with the internal toothed portion 1a of frame 1. With this engagement, lock mechanism 7 prevents the payout of seat belt 3 by preventing the rotation of reel 5 in the belt extracting direction alpha. When a force is further applied to pull out seat belt 5, torsion bar 29 twists and reel 5 alone rotates by a predetermined amount in the belt extracting direction alpha.

When seat belt 3 is pulled out at a normal speed, reel 5, torsion bar 29, locking base 33 and lock gear 37 all rotate in the belt extracting direction alpha, and flywheel 39 rotates together with lock gear 37. Lock gear 37 does not rotate relative to flywheel 39.

When seat belt 3 is pulled out abruptly, flywheel 39 delays in rotation with respect to lock gear 37, and hence flywheel 39 rotates relative to lock gear 37. With this relative rotation, claw 39a of flywheel 30 moves to a position engaging with the internally toothed portion 41a of retainer 41, and prevents further rotation of lock gear 37 in the belt extracting direction alpha. As a result, reel 5 cannot rotate in the belt extracting or payout direction alpha.

A reel rotation volume sensing mechanism 61 shown in FIG. 4 is arranged to sense rotation of torsion bar 29, that is, an amount of rotation of reel 5 in terms of the absolute value, and produces an electric signal representing the sensed absolute value of the amount of rotation. Reel rotation volume sensing mechanism 61 is enclosed by a cover 63. A cove 64 shown in FIG. 1 is a cover on the opposite side of frame 1, facing to the outer surface of side wall 23.

Force limiter mechanism (or EA mechanism) 13 includes torsion bar 29, and a hollow cylindrical stopper 31 screwed onto a threaded shaft portion 33b of locking base 33. Torsion bar 29 has a first torque transmitting portion 29a near a first end, and a second torque transmitting portion 29b near a second end of torsion bar 29. First torque transmitting portion 29a is hexagonal in cross section, and fit in a hexagonal hole 33c of locking base 33 so that first torque transmitting portion 29a cannot rotate relative to locking base 33. Second torque transmitting portion 29b is fit in a shaft gear 27.

Cylindrical stopper 31 has internal threaded portion 31a into which threaded shaft portion 33b of locking base 33 is screwed. Stopper 31 further includes two outward projections 31b located at diagonally opposite positions. Rotation torque is transmitted from reel 5 to stopper 31. With outward projections 31b, stopper 31 rotates as a unit with reel 5, and stopper 31 is movable axially, relative to reel 5.

When, therefore, reel 5 rotates, in the belt payout direction alpha, relative to locking base 33, stopper 31 rotates together with reel 5 relative to locking base 33, and hence moves axially until stopper 31 abuts against a disk portion 33d of locking base 33. When stopper 31 abuts against locking base 33, stopper 31 stops moving axially, and rotates as a unit with locking base 33.

Thus, while stopper 31 and locking base 33 rotate relative to each other, torsion bar 29 is twisted, and EA mechanism can achieve the EA function of limiting belt load in case of vehicle collision. When stopper 31 abuts against locking base 33, the EA function ends. Thus, the range of the EA function is bounded by stopper 31 with internal threaded portion 31a and locking base 33 with external threaded shaft portion 33b.

Motor 15 is mounted on frame 1 through a motor bracket 67, as shown in FIG. 1. Motor torque is transmitted from motor 15, through speed reduction mechanism including reduction gear 17 and planetary gear set 19, to reel 5, as shown in a front view of FIG. 7A and a plan view of FIG. 7B.

Rotation of motor 15 at a speed reduced by reduction gear 17 is inputted to a sun gear 69 of planetary gear set 19, and transmitted to four planet pinions 71 supported by a planet carrier 75. When a ring gear 73 is held, the rotation is transmitted to planet carrier 75, which drives shaft gear 27. In this state, planetary gear set 19 rotates reel 5, and reel 5 winds up belt 5.

Figure 8:
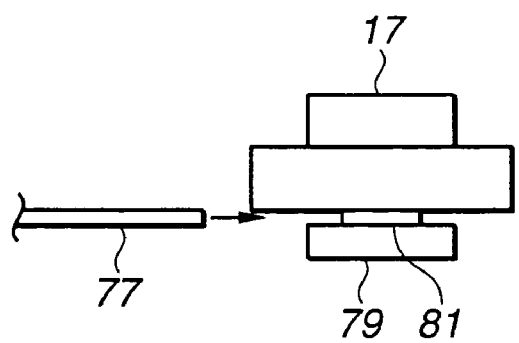
FIG. 8 is an enlarged view showing an arm and a reduction gear shown in FIGS. 7A and 7B.
Figure 9:
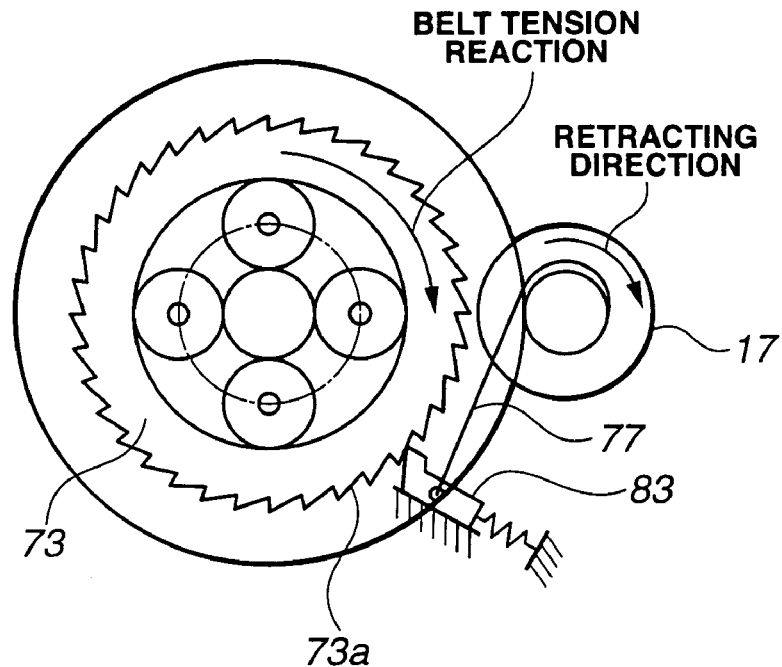
FIG. 9 is a view of the motor torque transmitting mechanism for illustrating a belt retracting operation.

An arm 77 includes a first end swingably wound on a shaft portion 81 of reduction gear 17 between a main portion and a flange 79, as shown in FIG. 8 on an enlarged scale. A second end of arm 77 is connected with a lock key 83. When motor 15 is driven in the belt retracting direction, arm 77 moves with rotation of reduction gear 17, and brings lock key 83 engaged with a ratchet portion 73a formed on an outer periphery of ring gear 73. BY the engagement between lock key 83 and ratchet portion 73a, ring gear 73 is held stationary, and therefore, rotation of motor 15 is transmitted to reel 5, so that seat belt 3 is wound up and the belt tension is increased.

Figure 10:
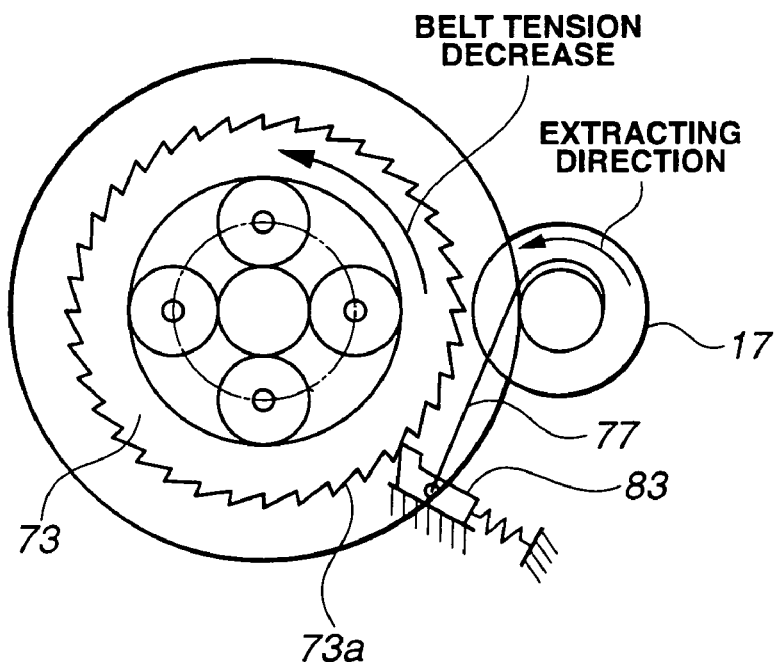
FIG. 10 is a view of the motor torque transmitting mechanism for illustrating a belt tension releasing operation.
Figure 11A:
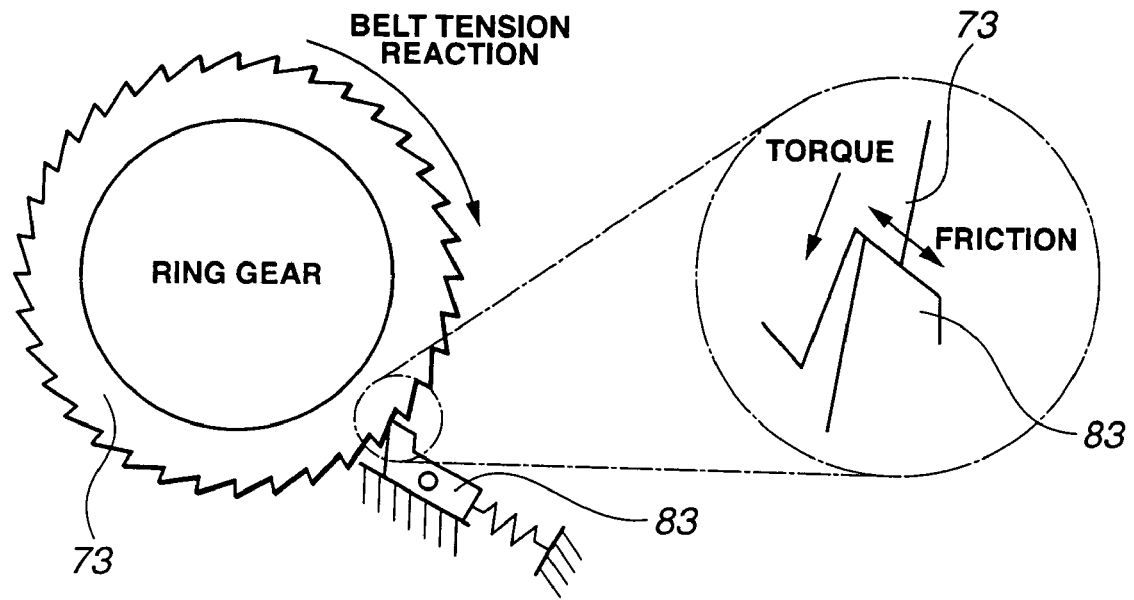
FIGS. 11A and 11B are views for illustrating friction between ring gear and lock key shown in FIGS. 7A and 7B, in belt retracting and extracting operations.
Figure 11B:
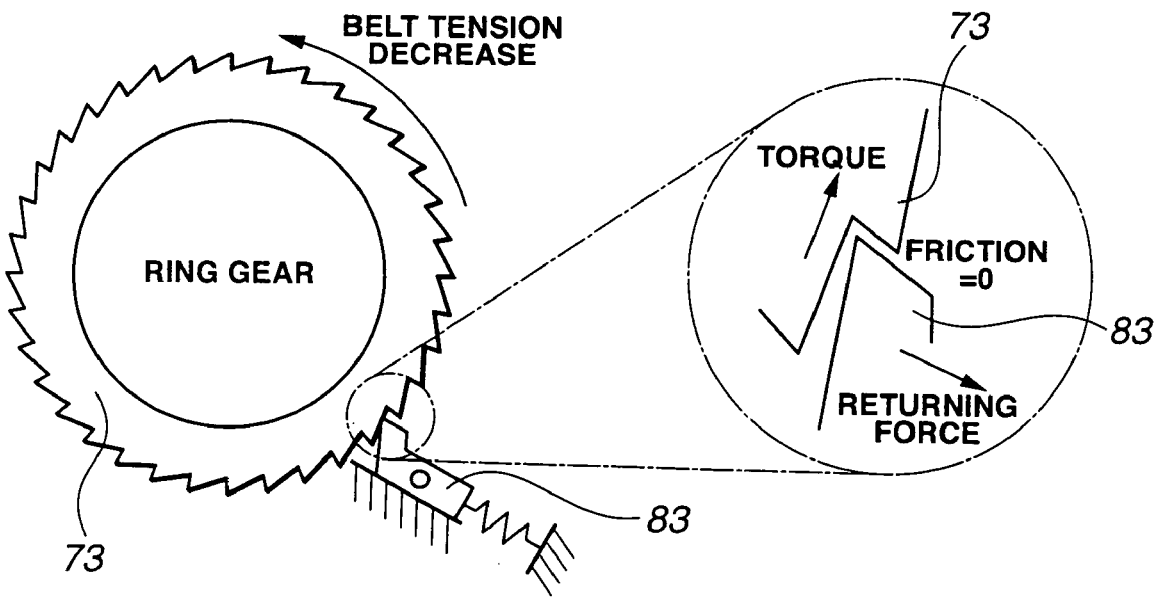

When motor 15 is driven in the reverse direction, arm 77 tries to return lock key 83 to an original position, as shown in FIG. 10. However, when belt 3 is under tension, a friction force acts, as shown in FIG. 11A, between ratchet portion 73b of ring gear 73 and lock key 83, and hence lock key 83 does not return to the original position. When motor 15 is further driven in the reverse direction, seat belt 3 is pulled out, and the belt tension becomes lower. Therefore, as shown in FIG. 11B, the friction force decreases between ratchet portion 73b of ring gear 73 and lock key 83, and lock key 83 returns to the original disengaged position.

When lock key 83 is disengaged from ring gear 73, and ring gear 73 becomes able to rotate freely, torque is not transmitted between motor 15 and reel 5, and the belt tension decreases.

The seat belt system according to the first embodiment includes a controller 103 that can serve as belt tension holding means for holding the belt tension by supplying current to motor 15 for a longer time without overheat of motor 15. Controller 103 has a belt retracting or winding mode and a belt tension holding mode for controlling motor 15 so as to hold the belt tension. In the belt tension holding mode, controller 103 controls the motor current supplied to motor 15 to a lower level than in the belt retracting mode.

Figure 12A:
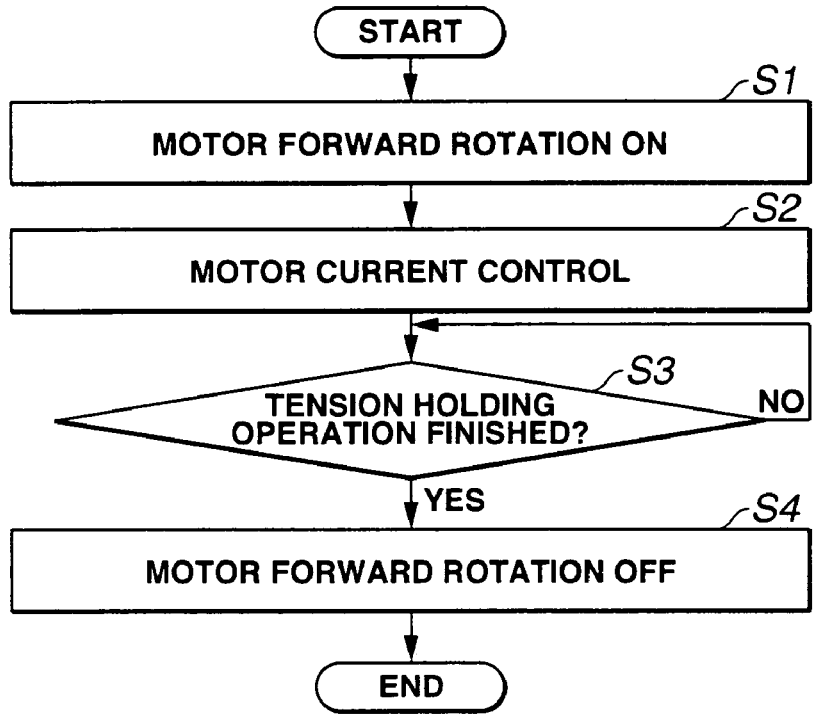
FIG. 12A is a flowchart of a motor control process according to the first embodiment.

FIG. 12A is a flowchart showing a motor control process performed by the seat belt system according to the first embodiment. Motor 15 is driven in the forward direction and the seat belt system starts retracting seat belt 3 (step S1). When the belt retracting operation is finished, controller 103 controls the motor current to control the belt tension (step S2). Thereafter, when the tension holding operation is finished (step S3), the motor forward rotation is turned off (step S4).

When motor 15 is driven in the belt tension holding mode after the belt tension is increased, the motor torque transmitted to seat belt 3 is reduced by the friction in the mechanical parts of the motor, gears and retractor, the friction between belt 3 and a through ring, and the friction between belt 3 and the clothing of the belt wearer, so that the belt winding speed is decreased significantly or the belt 3 cannot be wound up.

Figure 12B:
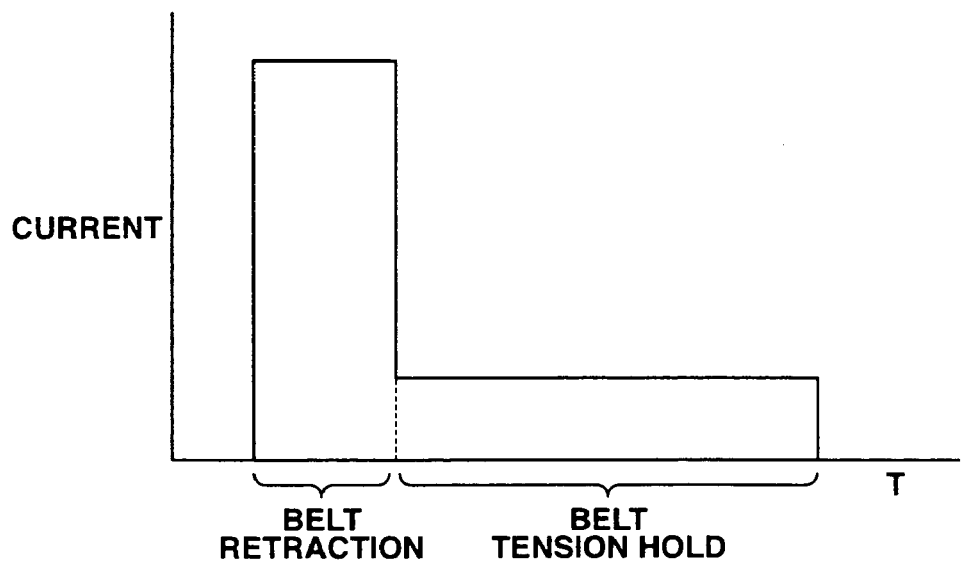
FIG. 12B is a graph showing motor current levels in a belt retracting operation and a belt tension holding operation in the motor control process of FIG. 12A.

In this state, belt 3 cannot be pulled out unless belt 3 is pulled with a force overcoming a resisting force due to the frictional forces at various portions and the motor torque. This resisting force is sufficient to lock seat belt 3 against a force applied by the seat belt wearer pushed forward by the vehicle deceleration, and to hold the belt tension. Motor current required to be supplied to motor 15 is significantly lower than motor current to retract seat belt 3. Therefore, the seat belt system can hold the seat belt tension for a long time without overheat of motor 15. As shown in FIG. 12B, the motor current is very low in the belt tension holding operation, as compared to the motor current required for the belt retracting operation. Therefore, the seat belt system can avoid trouble of overheating.

Figure 13:
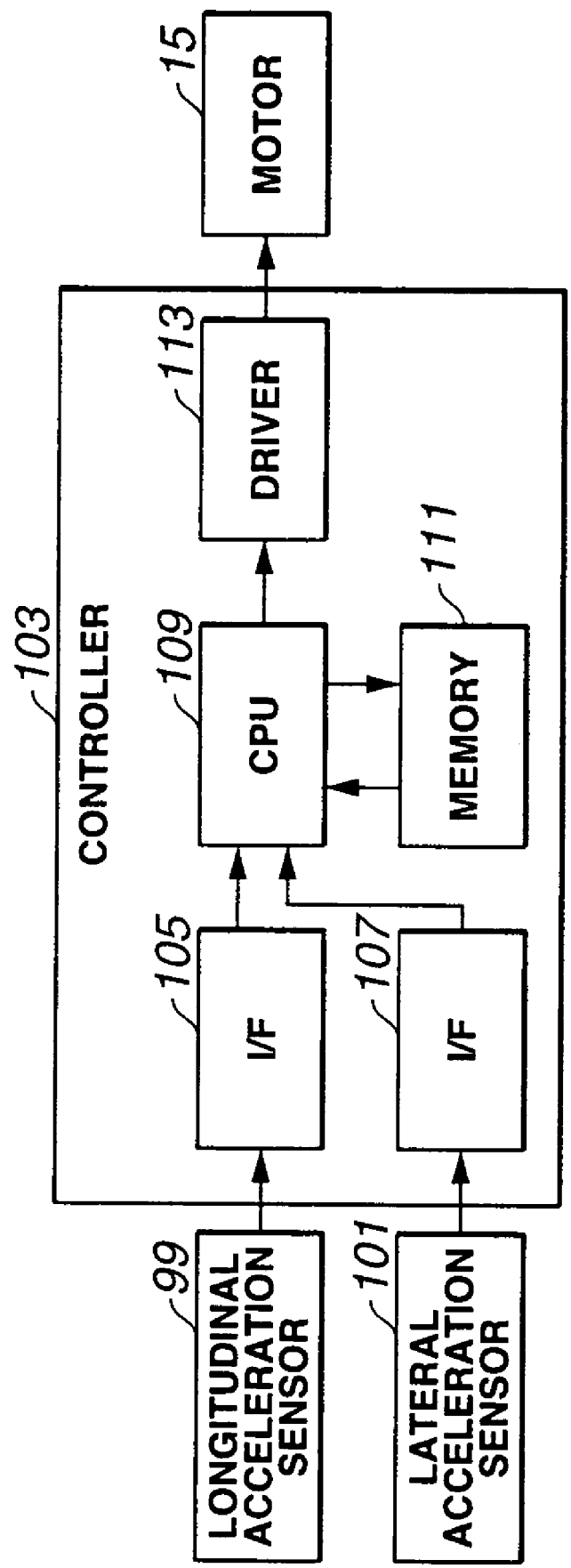
FIG. 13 is a block diagram of a control system in the seat belt apparatus of FIG. 1.

FIG. 13 shows a control system for the belt tension control. A sensing section of the control system includes a longitudinal acceleration sensor 99 for sensing a longitudinal acceleration of the vehicle, and a lateral acceleration sensor 101 for sensing a lateral acceleration of the vehicle. Acceleration sensors 99 and 101 are mounted on the vehicle, and arranged to produce voltage signals representing vehicle deceleration and centripetal acceleration. These voltage signals are inputted to controller 103. In controller 103, the voltage signals are converted, respectively, to digital values by I/F circuits 105 and 107, and transferred to a CPU 109. CPU 109 fetches a program stored in a memory 111, and performs operations according to the program, by temporarily storing data during computation in memory 111. CPU 109 determines the on/off of current supply to motor 15 in accordance with the sensed values of acceleration sensors 99 and 101, and drives a driver circuit 113 (lock operation limiting means).

Figure 14:
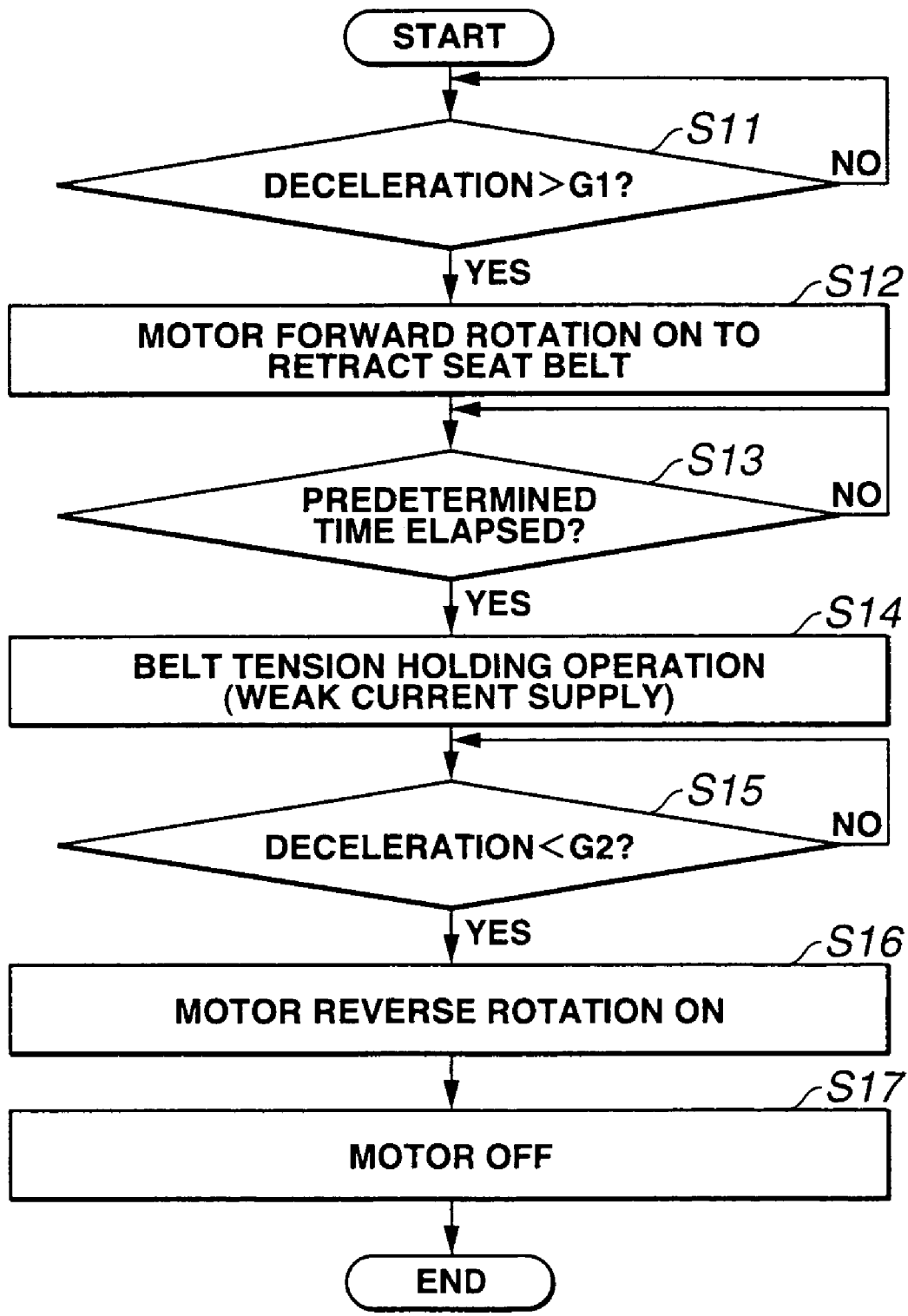
FIG. 14 is a flowchart of a seat belt tension control method performed by the seat belt apparatus according to the first embodiment.

FIG. 14 is a flowchart showing a belt tension control process performed by CPU 109 of this example. CPU 109 compares the sensed deceleration with a predetermined threshold value G1 at step S11. Threshold value G1 is a value of deceleration for discriminating hard braking. In this example, G1 is equal to a value greater than 5 m/s$^2$. G1 may be set equal to 7 m/s$^2$, for example. When the sensed deceleration is greater than the threshold value G1, CPU 109 supplies current to motor 15 to drive motor 15 in the forward direction, and thereby winds up belt 3 at step S12. By winding up belt 3 for a predetermined time length (step S13), the control system increases the belt tension.

After the elapse of the predetermined time length, CPU 109 proceeds to step S14, and performs the belt tension holding operation by supplying weak current to motor 15. The motor current to motor 15 is set at a value to make the belt tension weak. Thus, the seat belt system according to this embodiment can hold the state in which the seat belt is not retracted further, the seat belt cannot be pulled out as in the lock state, and the belt tension is increased. The current for the belt tension holding mode is so low that this system can prevent the overheating of motor 15.

When, in the state in which the belt tension is increased, the deceleration becomes lower than a predetermined value G2 (step S15), then CPU 109 rotates motor 15 in the reverse direction at step S16. G2 is a value of deceleration for detecting an end of braking. In this example, G2 is equal to a value greater than 0 m/s$^2$, and smaller than or equal to 1 M/s$^2$ (0<G2<1 m/s$^2$). G1 may be set equal to 1 m/s$^2$, for example. In this case, inertia mass 53 is restored to the upright position since the deceleration is low. Because the belt is locked in the belt retracted state, claw 59 of actuator 43 is in the disengaged position disengaged from lock gear 37. Accordingly, actuator 43 descends as inertia mass. 53 moves to the upright position. By the reverse rotation of motor 15, the seat belt is unwound and the belt tension is cancelled. The system continues the motor reverse rotation only for a short time required to cancel the belt tension, and then terminates the supply of current to motor 15 (step S17).

In this way, controller 103 prevents engagement of claw 59 of actuator 43 with external ratchet teeth portion 37b of lock gear 37, by supplying current to drive motor 15 in the forward direction after the belt is wound up. At the end of the belt tension holding mode, controller 103 decreases the belt tension by rotating motor 103 momentarily in the reverse direction.

Though, in the program of FIG. 14, the belt tension is controlled in accordance with the deceleration, it is possible to control the belt tension in accordance with the lateral acceleration or in accordance with longitudinal acceleration and lateral acceleration in combination. Moreover, it is possible to control the belt tension in accordance with a condition in the surroundings of the vehicle by using a senor for sensing the condition in the surroundings. For example, it is possible to control the belt tension in accordance with a distance to an obstacle ahead of the vehicle and a relative speed with respect to the obstacle by using a sensor for sensing the obstacle ahead.

This seat belt system is operated in the following manner when the vehicle is decelerated. When the deceleration becomes greater than or equal to a predetermined threshold value, inertia mass 53 inclines and raises actuator 43, and engaging claw 59 of actuator 43 abuts against ratchet portion 37b of lock gear 37. On the other hand, longitudinal acceleration sensor 99 senses the increase of the deceleration and delivers the signal to controller 103. Controller 103 drives motor 15 by supplying the motor current command to retract seat belt 3 with a force corresponding to the deceleration. Engaging claw 59 of actuator 43 is arranged to lock the rotation of locking gear 37 in the belt extracting direction, but to allow the rotation of locking gear 37 in the belt retracting direction. Therefore, seat belt 3 is retracted and the belt tension is increased during deceleration.

After belt 3 is wound up, controller 103 supplies weak current to motor 15 to perform the belt tension holding operation. The current in the belt tension holding mode is set equal to such a value as to make the seat belt tension smaller than or equal to 100N (newton). In this state, the seat belt system does not retract belt 3 any more, but locks belt 3 from being extracted, against a force for pulling out belt 3.

In this state, seat belt 3 is not extracted and therefore, claw 59 of actuator 43 and ratchet portion 37b of lock gear 37 are not engaged even though inertia mass 53 lifts actuator 43 by the action of deceleration. When the deceleration ends, inertia mass 53 restores to the upright position, and actuator 43 moves downward since claw 59 of actuator 43 is not engaged with ratchet portion 37b of lock gear 37.

When controller 103 judges that the deceleration subsides, controller 103 stops the supply of current to motor 15, and then drives motor 15 in the belt extracting direction. With this rotation, lock key 83 disengages from ring gear 73, and ring gear 73 is released for free rotation. In this state, torque cannot be transmitted between motor 15 and reel 5.

Inertia mass 53 is in the upright position, and actuator 43 is in the lower position. Therefore, lock gear 37 is rotatable freely, and the belt tension is cancelled.

After the seat belt tension is increased, the seat belt system according to the first embodiment of the present invention performs the belt tension holding operation by continuing the supply of weak current to motor 15 to hold the seat belt in the retracted state. The lock operation of the seat belt retractor is achieved when the seat belt is pulled out in the state of acceleration due to acceleration/deceleration or cornering. In the belt tension holding mode, the lock operation of the seat belt retractor is inoperative even if the acceleration is acting, because the seat belt is held in the retracted state.

After the end of acceleration/deceleration or cornering, the seat belt system can relieve the belt tension by rotating motor 15 in the reverse direction, and cutting off the transmission path between motor 15 and reel 5. Thus, the seat belt system can restrict the retractor's lock operation by continuous supply of weak current to motor 15, without the need for additional mechanism for restricting the lock operation.

The seat belt system or apparatus according to the first embodiment is arranged to retract the seat belt on the occurrence of excessive longitudinal acceleration during deceleration, and to prevent or restrict the lock operation of the seat belt retractor with means for rotating the reel in the belt retracting direction after the belt retracting operation. Moreover, the system employs motor 15 as the means for rotating the reel in the belt retracting direction, and controls the motor current to a constant current as to hold the belt tension equal to or smaller than 100 N. The control of the motor current in this mode is continued until the possibility of vehicle collision disappears.

Instead of controlling the motor current directly, it is possible to control the motor current by controlling a voltage. The effective voltage applied to motor 15 can be controlled by varying a duty ratio. The motor current is equal to a value obtained by diving the voltage applied to motor 15 by a winding resistance of motor 15. Therefore, the seat belt system can control the current by controlling the voltage.

In this embodiment, the system restricts the lock operation by rotating motor 15 in the retracting direction with a constant current. To this end, the system can control the motor current at the constant value easily by controlling the duty ratio for motor 15 at a constant value. At the time of the lock restricting operation, motor 15 is in a nearly stationary state with little or no rotation, so that the winding resistance of motor 15 is constant. Alternatively, to control the current to a constant value more accurately, it is optional to control the motor current so as to reduce a deviation of an actual motor current sensed by a current sensor for sensing the motor current, from a desired current.

The seat belt system according to the present invention is arranged to restrain or restric the seat belt locking operation by using means for rotating motor 15 in the belt retracting direction. Therefore, the lock restricting operation can be performed by using the existing belt retracting mechanism, without the need for addition of a new lock restricting mechanism. The belt tension is controlled on the occurrence of excessive deceleration/acceleration. Therefore, the seat belt system can restrain a seat belt wearer reliably in case of need. The lock restricting operation is achieved by controlling the motor current. Therefore, it is possible to restrain or restrict the seat belt locking operation precisely. The motor current is controlled to a very low level such as a level to decrease the belt tension to a value lower than or equal to 100N. Therefore, the seat belt system can save the current consumption.

The seat belt system can restrain the belt wearer securely by continuing the supply of motor current until the possibility of vehicle collision diminishes (or the deceleration becomes lower than G2). Moreover, by controlling motor 15 so that the motor current remains constant, the seat belt system can hold the belt tension constant. When the voltage applied to motor 15 is controlled to a constant value, the control is simplified.

Figure 15A:
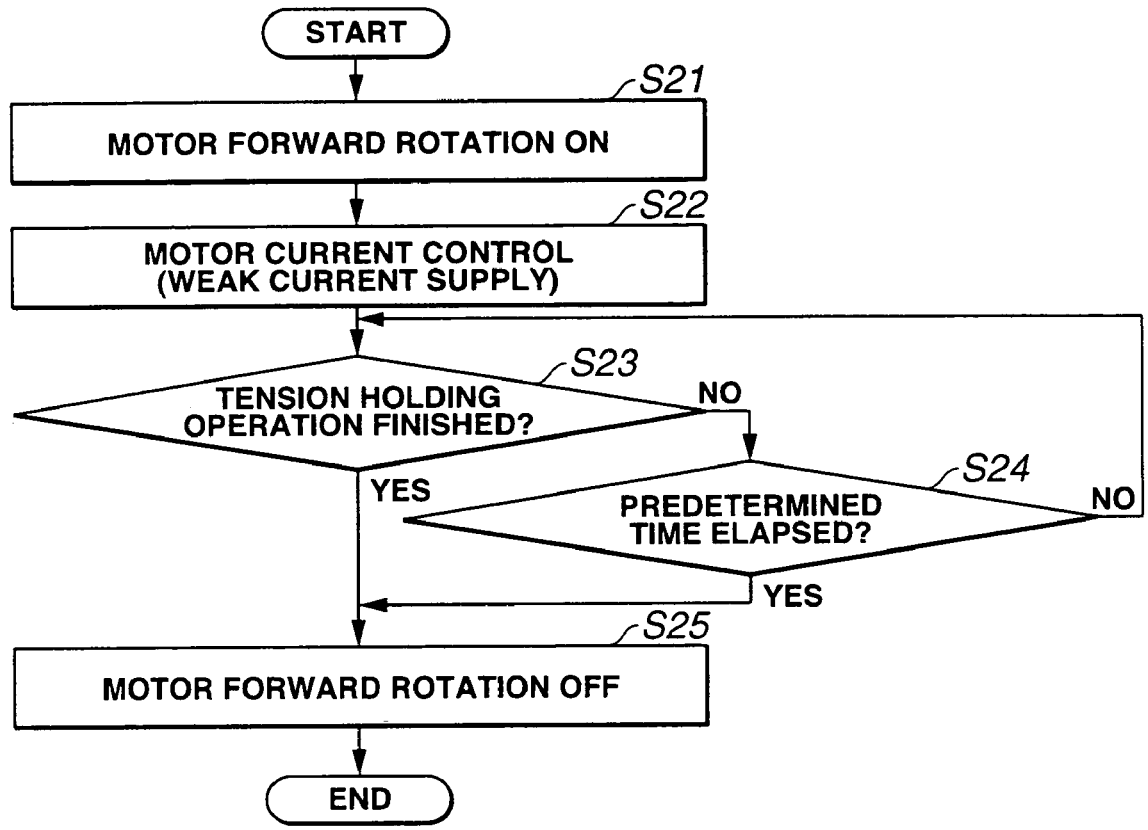
FIG. 15A is a flowchart of a motor control process according to a second embodiment.
Figure 15B:
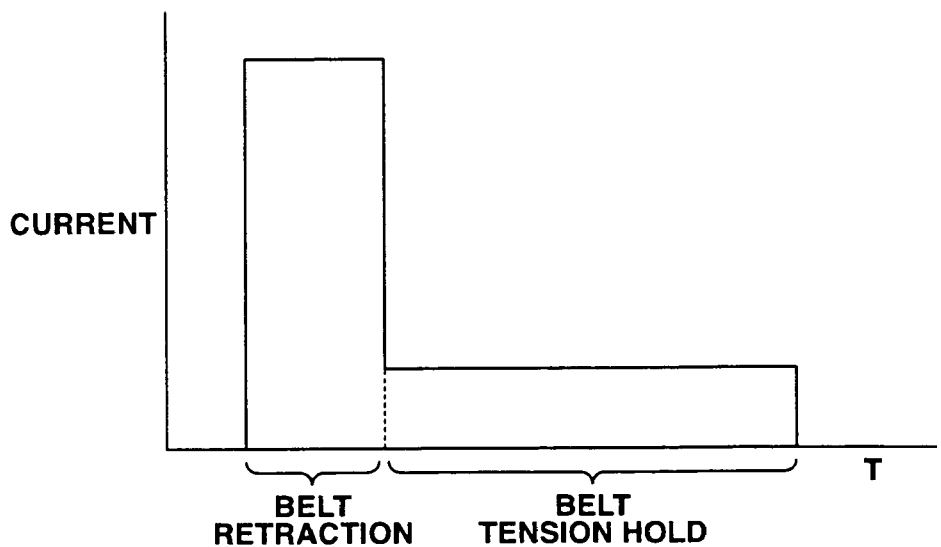
FIG. 15B is a graph showing motor current levels in the belt retracting operation and the belt tension holding operation in the motor control process of FIG. 15A.
Figure 16:
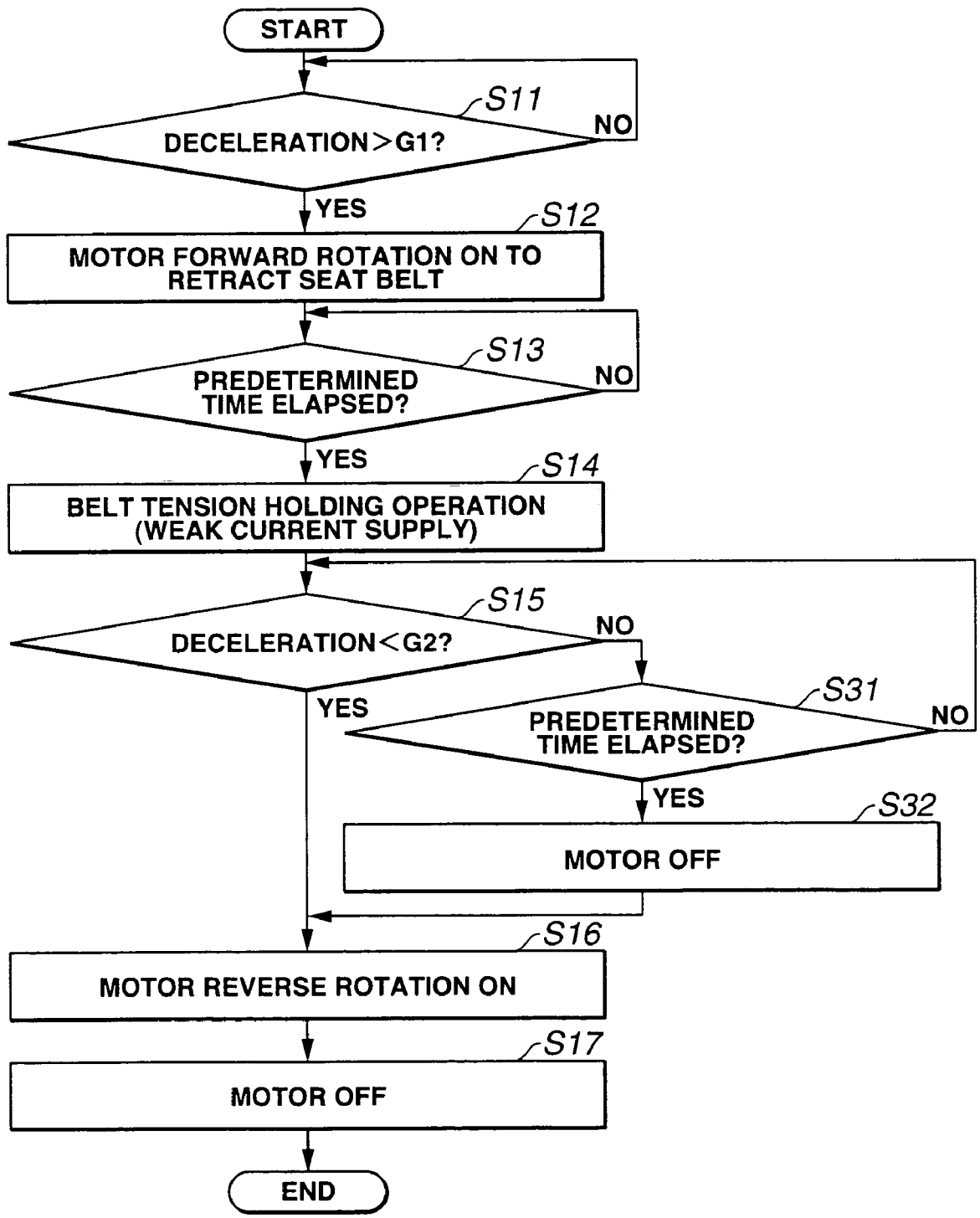
FIG. 16 is a flowchart of a seat belt tension control method performed by a seat belt apparatus according to the second embodiment.

FIGS. 15A, 15B and 16 show a seat belt system or apparatus according to a second embodiment of the present invention. The seat belt system of the second embodiment is arranged to terminate the supply of motor current for restricting the seat belt locking when the time of continuance of the current supply becomes longer than or equal to a predetermined time period. In other respects, the system of the second embodiment is identical to the system of the first embodiment.

FIG. 15A is a flowchart showing a motor control process performed by the seat belt system according to the second embodiment. When motor 15 is driven in the forward direction, the seat belt system starts winding seat belt 3 (step S21). Then, controller 103 controls the motor current to control the belt tension (step S22). Thereafter, when the tension holding operation is finished (step S23), the motor forward rotation is turned off (step S25). Furthermore, the motor forward rotation is turned off when a predetermined time period has elapsed (S25) even if the tension holding operation is not finished. Therefore, though the motor current is high in the belt retracting mode, the seat belt system decreases the motor current to a very low value as shown in FIG. 15B, and avoids trouble of overheating.

In the second embodiment, the belt tension holding time for holding the belt tension in the retracted state is limited to a predetermined time period as a maximum, and the motor current supply is stopped when the elapsed time exceeds the predetermined time period. In this example, the predetermined time period is set equal to 10 sec since it takes 9.3 sec to decelerate a vehicle at 3 m/s from 100 km/h to a stop. Alternatively, the predetermined time period is set equal to 20 sec in consideration of leeway. By setting the time length in this way, the system can cover a normal hard braking operation time in most cases. By setting the upper limit of the continuance of current supply, the specifications of motor 15 and drive circuit can be limited, and the design becomes easier.

FIG. 16 is a flowchart showing a belt tension control process performed by CPU 109 according to the second embodiment. The flowchart of FIG. 16 is different in addition of steps S31 and S32 from the flowchart of FIG. 14 of the first embodiment. When the sensed deceleration remains greater than or equal to G2 for a time longer than a predetermined time period (10 sec, for example), CPU 109 stops the supply of current to motor 15 at steps S31 and S32. CPU 109 proceeds to step S31 when the sensed deceleration is higher than or equal to G2, and hence the answer of S15 is negative. CPU 109 checks the elapsed time at S31, and stops the supply of motor current at S32 when the duration of the motor current supply for the tension holding mode exceeds a predetermined time period (10 sec, for example). In this example, the elapsed time is measured from the start of the belt tension holding operation at S14.

By limiting the duration of the motor current supply in the tension holding mode (to 10 sec, for example), the seat belt system according to the second embodiment of the present invention can prevent overheat of motor 15 and the drive circuit securely and decrease the current consumption.

Figure 17A:
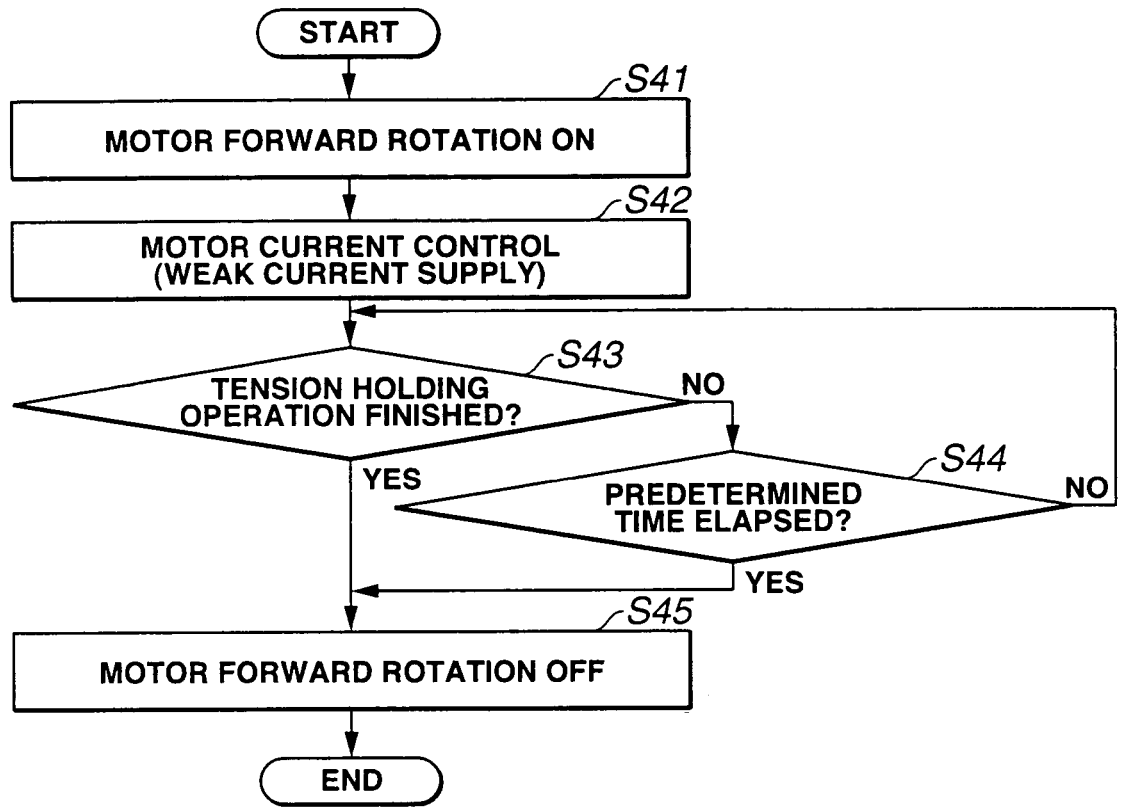
FIG. 17A is a flowchart of a motor control process according to a third embodiment.
Figure 17B:
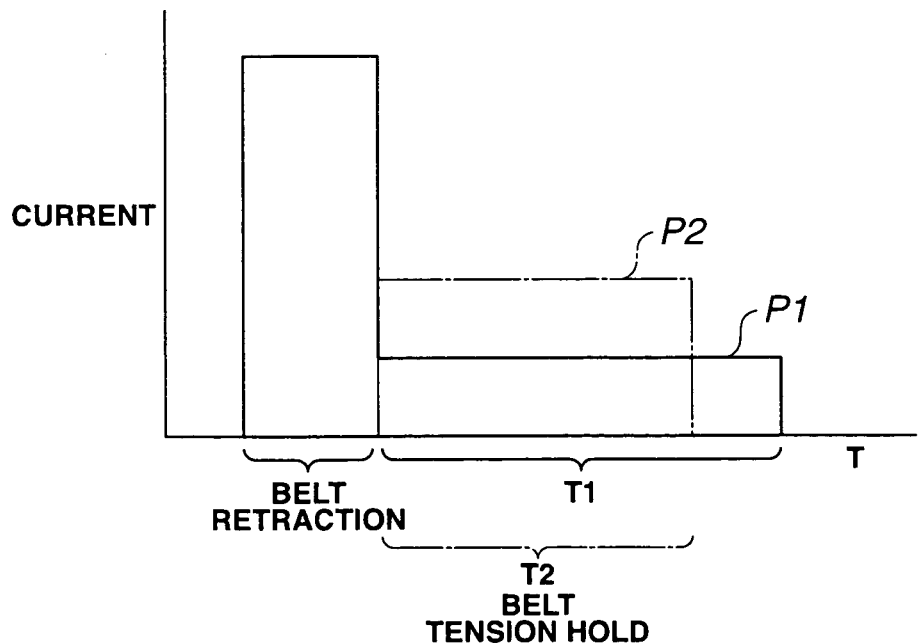
FIG. 17B is a graph showing motor current levels in the belt retracting operation and the belt tension holding operation in the motor control process of FIG. 17A.
Figure 18:
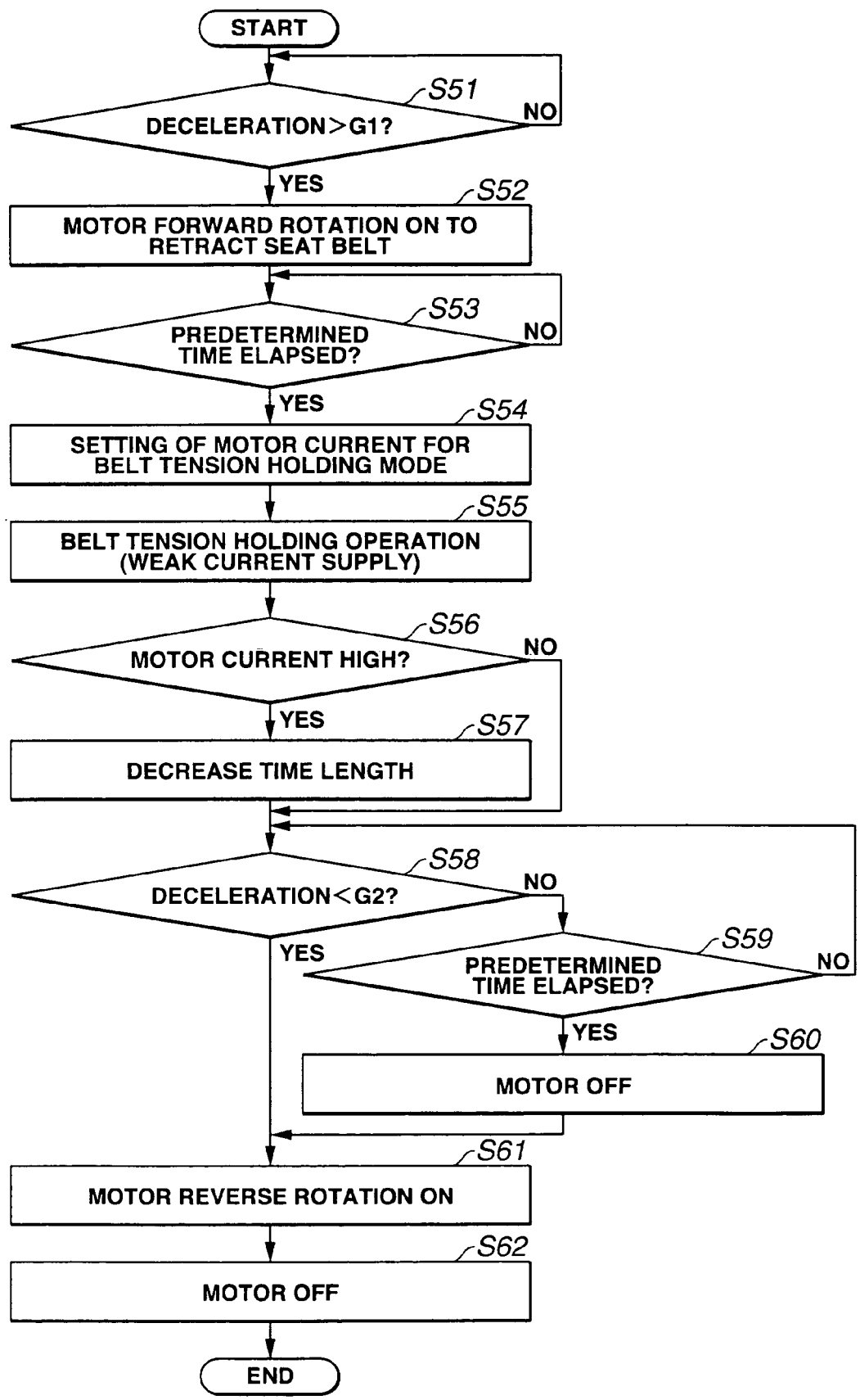
FIG. 18 is a flowchart of a seat belt tension control method performed by a seat belt apparatus according to the third embodiment.

FIGS. 17A, 17B and 18 show a seat belt system or apparatus according to a third embodiment. The seat belt system of the third embodiment is arranged to terminate the supply of motor current for restricting the seat belt locking when the duration of the current supply becomes longer than or equal to a predetermined time period as in the second embodiment, and further arranged to vary the time period in accordance with the motor current in the belt tension holding mode. In other respects, the system of the third embodiment is identical to the systems of the preceding embodiments.

FIG. 17A is a flowchart showing a motor control process performed by the seat belt system according to the third embodiment. Motor 15 is driven in the forward direction and the seat belt system starts winding seat belt 3 (step S41). Then, controller 103 controls the motor current to control the belt tension (step S42). Thereafter, when the tension holding operation is finished (step S43), the motor forward rotation is turned off (step S45). Furthermore, the motor forward rotation is turned off at the expiration of a predetermined time period determined in accordance with the motor current in the tension holding mode (S44). Therefore, though the motor current is high in the belt retracting mode, the seat belt system decreases the motor current to a very low value, and avoids trouble of overheating.

When the motor current in the belt tension holding mode is varied in accordance with a condition, data on the motor current commanded by controller 103 is stored in the memory. Alternatively, the motor current is sensed by using a current sensor, and the sensed motor current is inputted to controller 103. When the motor current for the tension holding mode is higher, the time period for limiting the duration of the tension holding mode is decreased from an initial value. When the motor current for the tension holding mode is lower, the time period for limiting the duration of the tension holding mode is increased from the initial value. Thus, the seat belt system sets the maximum tension holding time to a shorter time T2 as shown at P2 in FIG. 17B when the tension holding motor current is high, and sets the maximum tension holding time to a longer time T1 when the tension holding motor current is low.

FIG. 18 is a flowchart showing a belt tension control process performed by CPU 109 according to the third embodiment. CPU 109 compares the sensed deceleration with a predetermined threshold value G1 at step S51. When the sensed deceleration is greater than the threshold value G1, CPU 109 supplies current to motor 15 to drive motor 15 in the forward direction, and thereby winds belt 3 at step S52 for a predetermined time interval (step S53).

After the belt retracting operation for the predetermined time interval, CPU 109 proceeds from step S53 to step S54, and performs the belt tension holding operation by supplying weak current to motor 15 (at S54 and S55). CPU 109 sets the motor current for the tension holding mode at S54.

In this example, the motor current for the tension holding mode is varied in dependence on the deceleration of the vehicle. The tension applied to the belt in the restraint state restraining the belt wearer varies in accordance with the deceleration. Therefore, in order to restrain the wearer securely with less energy consumption, the seat belt system of the third embodiment varies the motor current for the belt tension holding mode in accordance with the deceleration. The belt tension in the restraint state is affected by the turning acceleration, lateral acceleration or the physique of the wearer. Therefore, it is optional to adjust the motor current for the tension holding mode in accordance with one or more of these conditions.

After the setting of the motor current at S54, CPU 109 decreases the motor current from the current for the belt retracting mode of S52, to the motor current value determined at S54 for the tension holding mode, and carries out the belt tension holding mode at S55. Then, CPU 109 compares the current supplied to motor 15 with a predetermined threshold value at step S56, and sets the maximum time duration to a smaller value if the motor current is higher than the predetermined threshold value at step S57. The predetermined threshold value of the current is a current value at which the amount of heat generated by the motor is greater than the amount of heat dissipation. This predetermined threshold value is determined in dependence on the characteristic of the motor and surroundings. For example, the predetermined threshold value is equal to or greater than a value of the holding mode multiplied by 1.1; and is equal to or smaller than the value of the holding mode multiplied by 2.

When, during the belt tension holding operation, the deceleration becomes lower than a predetermined value G2 (step S58), then CPU 109 rotates motor 15 in the reverse direction at step 61, and thereby cancels the belt tension. When the sensed deceleration remains greater than or equal to G2 for a time longer than the predetermined time duration (S59), CPU 109 stops the supply of current to motor 15 at step S60. Then, motor 15 is rotated in the reverse direction at S61, and stopped at S62.

Thus, in the third embodiment, the duration of the belt tension holding operation is adjusted in accordance with the motor current in the tension holding operation. The seat belt system according to the third embodiment can prevent overheat of motor 15 and the drive circuit securely, and decrease the current consumption properly, by increasing the duration of the tension holding mode when the motor current of the tension holding mode is low, and decreasing the duration of the tension holding mode when the motor current is high.

Figure 19:
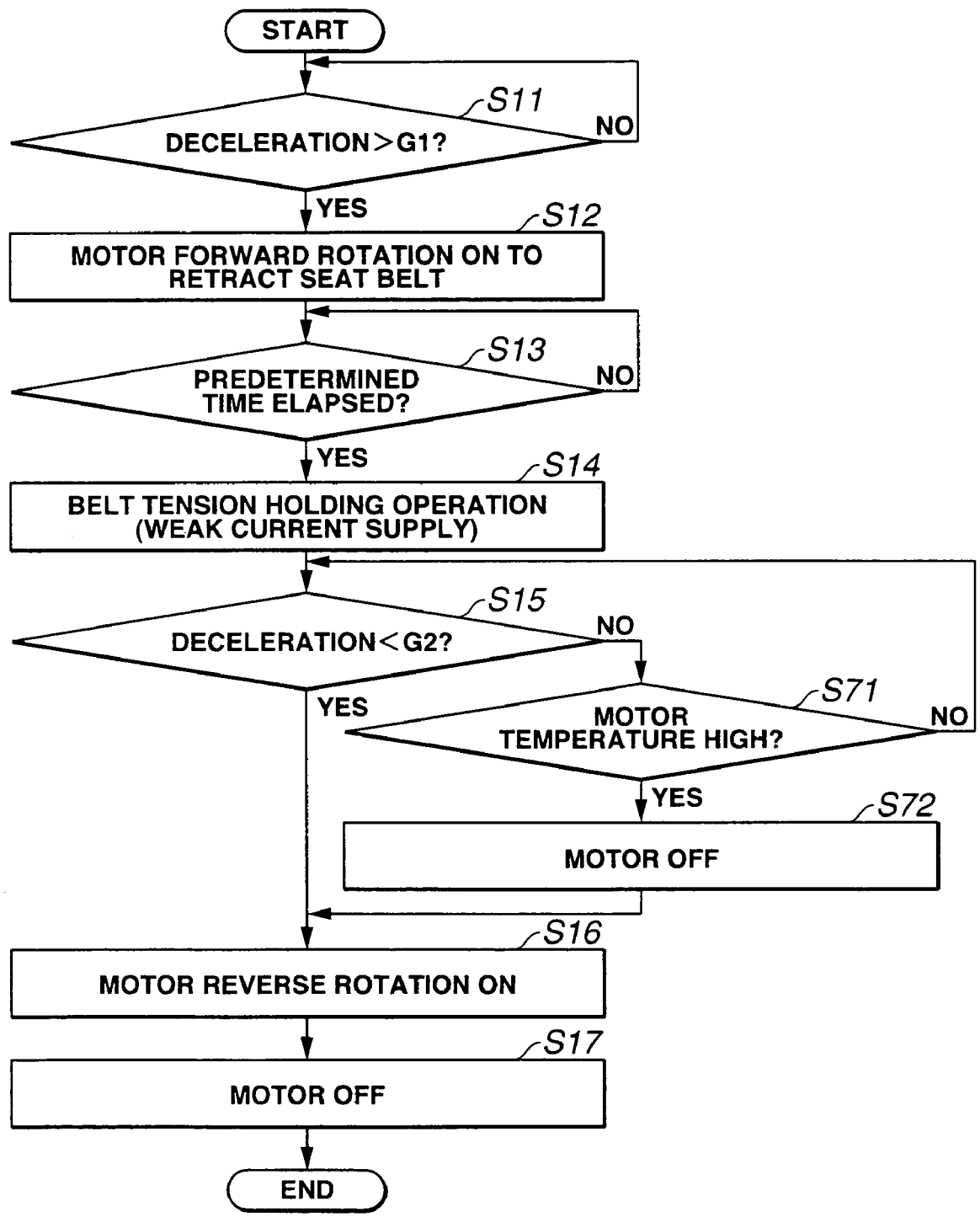
FIG. 19 is a flowchart of a seat belt tension control method performed by a seat belt apparatus according to a fourth embodiment.

FIG. 19 shows a seat belt tension control method performed by a seat belt system or apparatus according to a fourth embodiment. The seat belt system of the fourth embodiment is arranged to terminate the supply of motor current for restricting the seat belt locking in accordance with a temperature of a motor circuit of motor 15 and a motor drive circuit for driving motor 15. When the temperature becomes higher than a predetermined temperature, the current supply to motor 15 is stopped. In other respects, the system of the fourth embodiment is identical to the system of the first embodiment. Steps S11~S17 of FIG. 19 are substantially identical to S11~S17 of FIG. 14. Steps S71 and S72 are characteristic of the fourth embodiment.

At S71, CPU 109 checks whether the sensed temperature of the motor circuit becomes higher than the predetermined temperature. When the sensed temperature of the motor circuit is higher than the predetermined temperature, CPU 109 stops the supply of motor current at S72. In this embodiment, the seat belt system includes at least one temperature sensor (302a) for sensing the temperature of motor 15 or the temperature of the motor drive circuit (including driver circuit 113).

The seat belt system of the fourth embodiment stops the supply of current in the belt tension holding mode adequately when the temperature of the motor system is increased. Therefore, the system can determine the timing to stop the current supply accurately, and prevent the overheating of the motor system properly.

Figure 20:
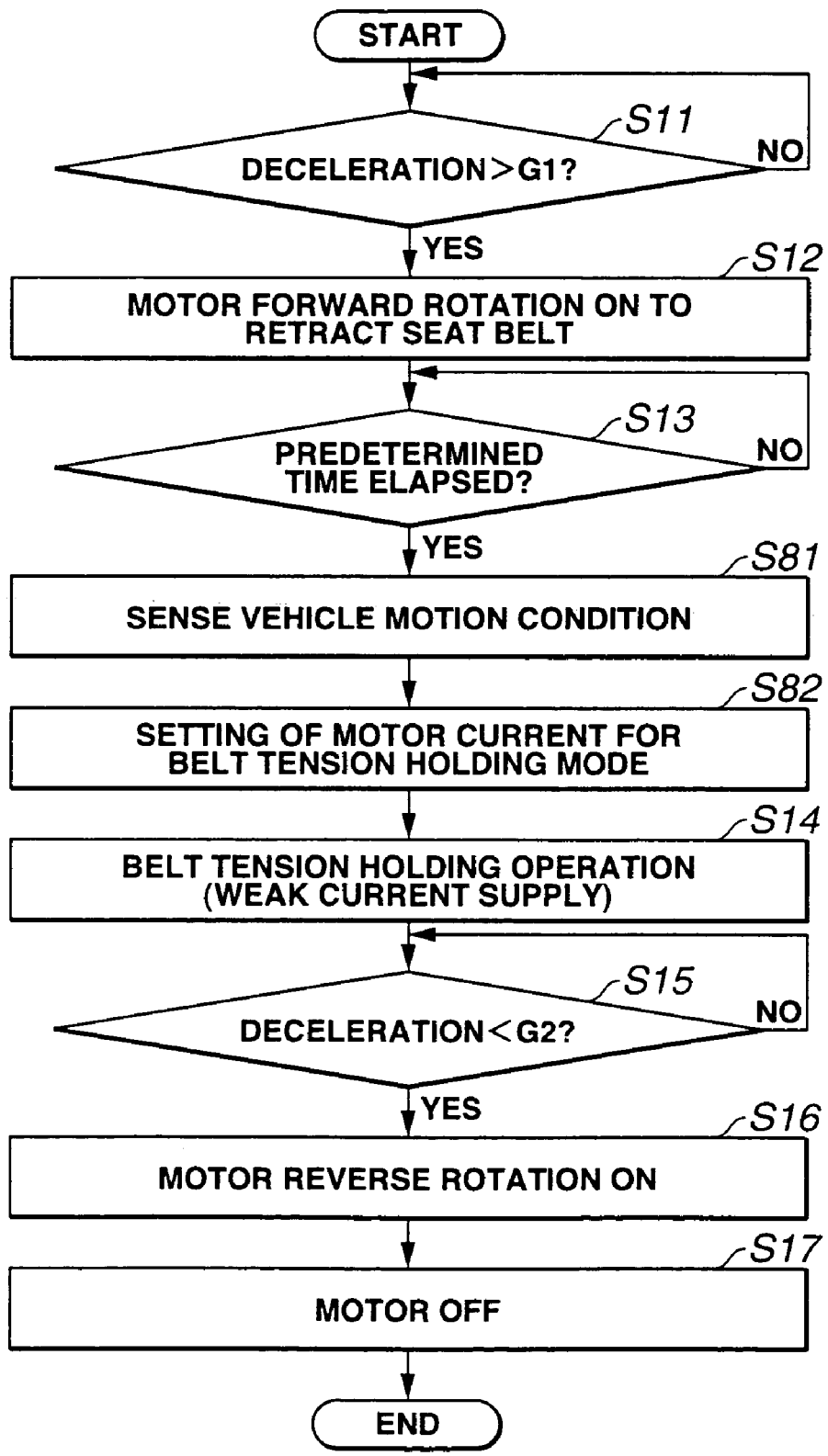
FIG. 20 is a flowchart of a seat belt tension control method performed by a seat belt apparatus according to a fifth embodiment.

FIG. 20 shows a seat belt tension control method performed by a seat belt system or apparatus according to a fifth embodiment. The seat belt system of the fifth embodiment is arranged to vary the motor current for restraining the seat belt locking in accordance with a vehicle motion condition such as a vehicle accelerating condition and a vehicle turning condition. The seat belt system of the fifth embodiment includes a vehicle motion sensor (302b), such as a longitudinal acceleration sensor, a lateral acceleration sensor, a yaw rate sensor, a brake sensor for sensing a brake operation, and a steering sensor for sensing a steering operation of the vehicle.

The motor current for the belt tension holding mode is determined in accordance with the vehicle motion condition such as deceleration or turning acceleration. When, during the tension holding operation, the deceleration or the turning acceleration increases, then the system increases the motor current for the tension holding mode. When, on the other hand, the deceleration or the turning acceleration decreases during the tension holding operation, then the system decreases the motor current for the tension holding mode.

In this case, however, the upper limit of the motor current for the tension holding mode is set to such a value that the belt tension does not exceed 100N. The lower limit of the motor current for the belt tension holding mode is set to such a value that motor 15 can produce a torque to hold lock key 83 in an engaged position engaging with ratchet 73a of ring gear 73, against the friction in motor 15, and other mechanical parts such as reduction gear 17.

The flowchart of FIG. 20 is different from FIG. 14 in the addition of steps S81 and S82 between S13 and S14. Step S81 is for sensing the vehicle motion condition, and S82 is for setting the motor current for the tension holding mode in accordance with the sensed vehicle motion condition.

When the sensed deceleration is greater than the threshold value G1 (S11), CPU 109 supplies current to motor 15 to drive motor 15 in the forward direction, and thereby winds up belt 3 at step S12. By winding up belt 3 for a predetermined time length (step S13), the seat belt system increases the belt tension.

At step S81 following S13, CPU 109 ascertains the sensed vehicle motion condition of the vehicle. At next step S82, CPU 109 sets the motor current for the belt tension holding mode in accordance with the vehicle motion condition obtained at step S81.

After S81 and S82, CPU 109 proceeds to step S14, and performs the belt tension holding operation by supplying weak current to motor 15. The motor current to motor 15 is set at a value determined at S82. When, in the state in which the belt tension is increased, the deceleration becomes lower than a predetermined value G2 (step S15), then CPU 109 rotates motor 15 in the reverse direction at step S16. By the reverse rotation of motor 15, the seat belt is unwound and the belt tension is cancelled. The system continues the motor reverse rotation only for a short time required to cancel the belt tension, and then terminates the supply of current to motor 15 (step S17).

In this way, the seat belt system according to the fifth embodiment is arranged to set the motor current for the tension holding mode in dependence on a sensed vehicle driving condition. In this example, the motor current for the tension holding mode is increased when the deceleration or the turning acceleration increases. The motor current for the tension holding mode is decreased when the deceleration or the turning acceleration decreases. By so doing, the seat belt system can restrain the seat belt wearer securely in dependence on the behavior of the vehicle, and at the same time prevent the overheating of the motor system.

Thus, by increasing the motor current in accordance with the vehicle motion condition, the seat belt system according to the fifth embodiment can restrain the seat belt wearer securely even if the acceleration of the vehicle becomes excessive. By decreasing the motor current in accordance with the vehicle motion condition, the seat belt system according to the fifth embodiment can control the belt tension adequately without causing an excessive restraint force to the belt wearer. By sensing the vehicle motion condition such as the vehicle acceleration/deceleration or the turning motion variable, the seat belt system according to the fifth embodiment can securely restrain unwanted movement of the seat belt wearer due to the vehicle motion.

Figure 21:
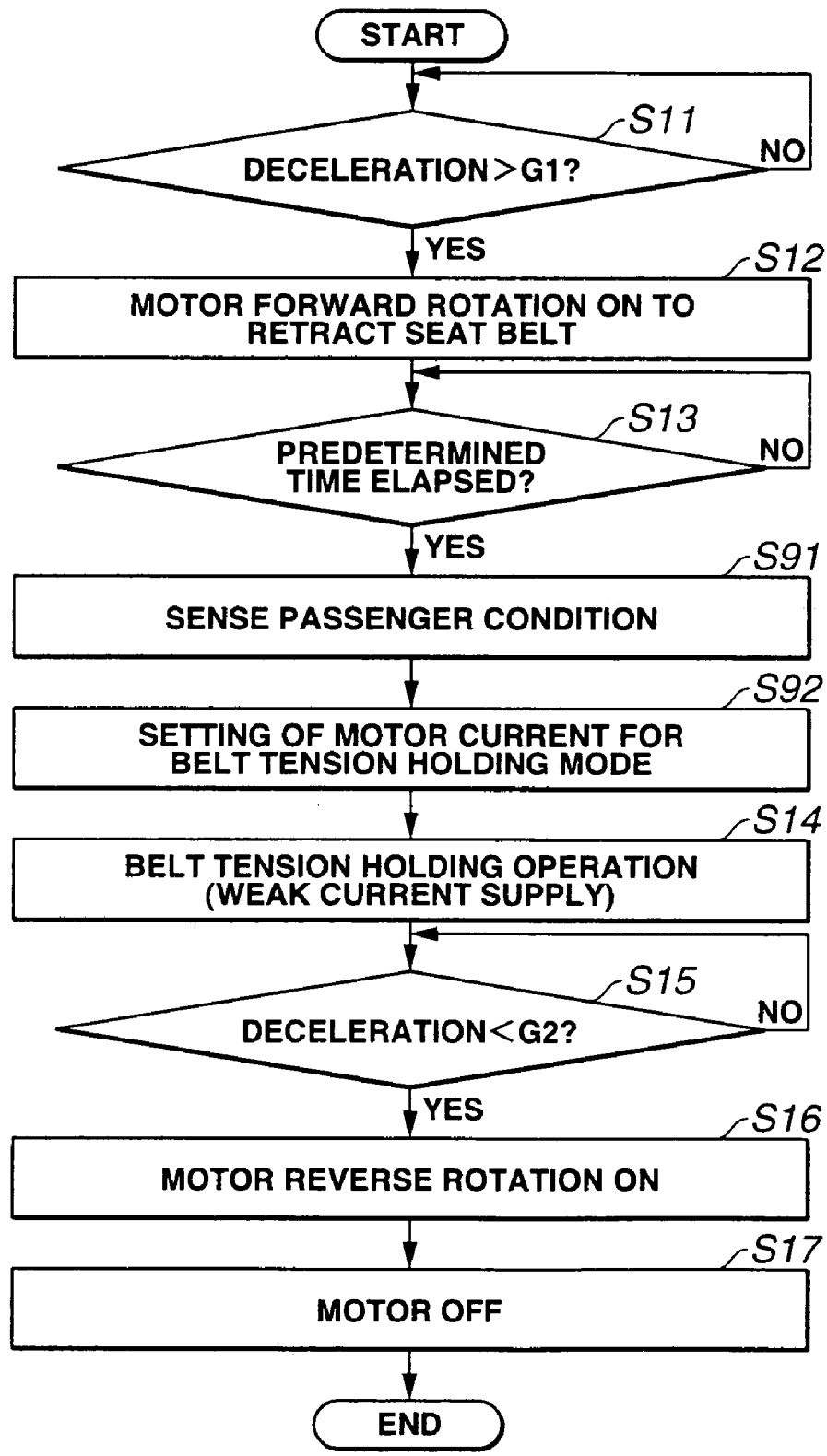
FIG. 21 is a flowchart of a seat belt tension control method performed by a seat belt apparatus according to a sixth embodiment.

FIG. 21 shows a seat belt tension control method performed by a seat belt system or apparatus according to a sixth embodiment. The seat belt system of the sixth embodiment is arranged to vary the motor current for restricting the seat belt locking in accordance with a sensed vehicle occupant condition such as a seating position, a posture or a physique of a belt wearer or occupant. The seat belt system of the sixth embodiment includes an occupant condition sensor (302c) for sensing the occupant condition.

When the occupant's body is big and heavy, the belt system requires a greater force to lock the seat belt against a force applied from the occupant due to vehicle motion. Therefore, the belt system of the sixth embodiment adjusts the motor current for the belt tension holding mode to a greater value. Moreover, the seat belt system of this example is arranged to sense the position and posture of the occupant during the belt tension holding operation, and increases the motor current for the belt tension holding mode as the position of the occupant is moved forward. The seat belt system decreases the motor current for the tension holding mode as the position of the occupant is moved backward.

The flowchart of FIG. 21 is different from FIG. 14 in the addition of steps S91 and S92 between S13 and S14. Step S91 is for sensing the occupant condition, and S92 is for setting the motor current for the tension holding mode in accordance with the sensed occupant condition.

When the belt retracting operation ends at the end of the predetermined time interval, CPU 109 proceeds from S13 to S91 and ascertains the occupant condition sensed by the occupant condition sensor. At next step S92, CPU 109 sets the motor current for the belt tension holding mode in accordance with the occupant condition obtained at step S91. After S91 and S92, CPU 109 proceeds to step S14, and performs the belt tension holding operation by supplying weak current to motor 15. The motor current to motor 15 is set at a value determined at S92.

In this way, the seat belt system according to the sixth embodiment sets the motor current for the tension holding mode in dependence on the sensed vehicle occupant condition. By so doing, the seat belt system can control the belt tension adequately in dependence on the physique of the occupant or forward or backward movement of the occupant, and at the same time prevent the overheating of the motor system.

Thus, by increasing the motor current in accordance with the passenger condition, the seat belt system according to the sixth embodiment can restrain the seat belt wearer securely, and prevent degradation of the restraint. By decreasing the motor current in accordance with the passenger condition, the seat belt system according to the sixth embodiment can control the belt tension adequately without causing an excessive restraint force to the belt wearer. By sensing the position, posture and physique of the occupant, the seat belt system of the sixth embodiment can control the belt tension precisely in dependence of the condition of each occupant.

Figure 22:
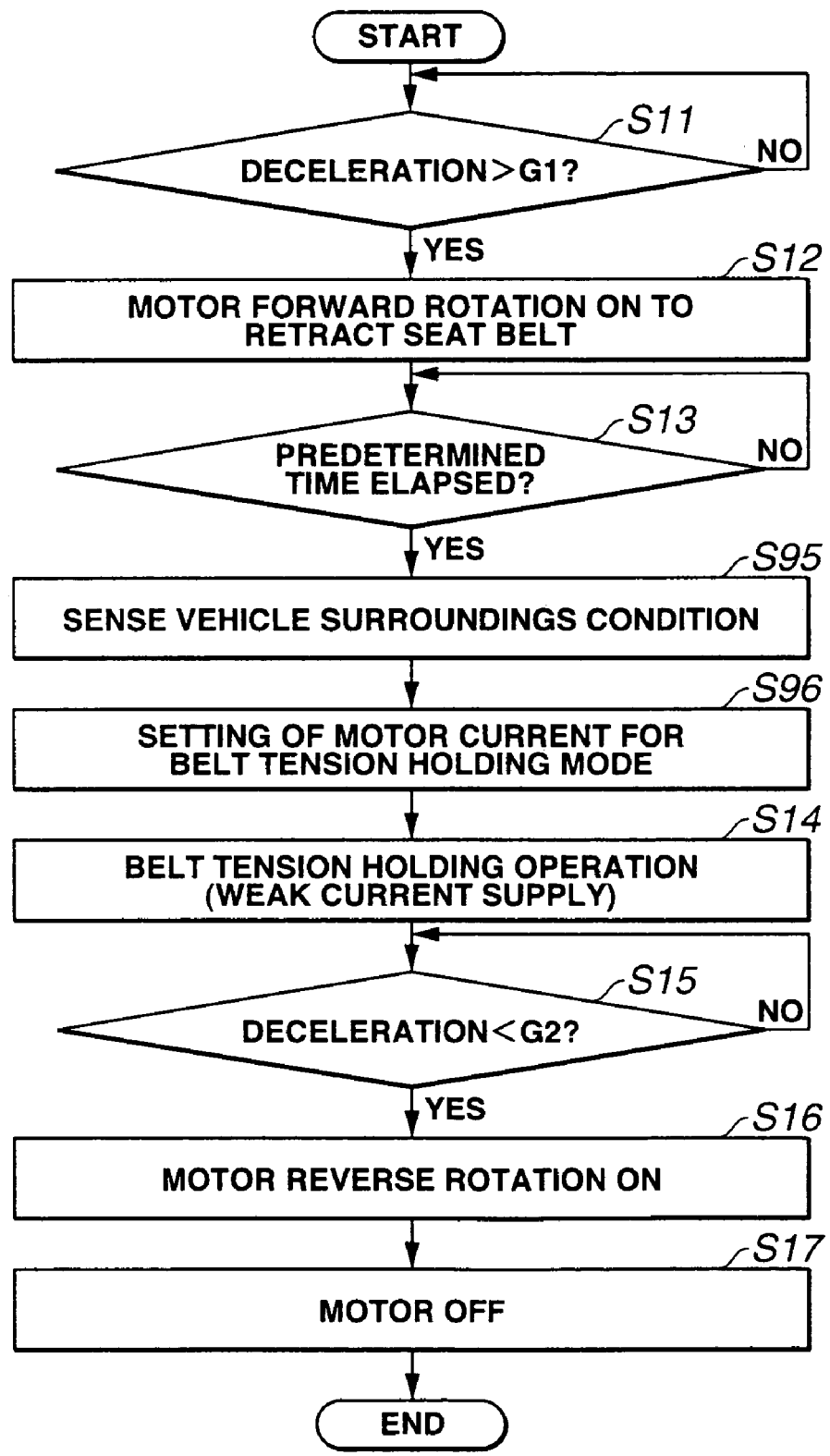
FIG. 22 is a flowchart of a seat belt tension control method performed by a seat belt apparatus according to a seventh embodiment.

FIG. 22 shows a seat belt tension control method performed by a seat belt system or apparatus according to a seventh embodiment. The seat belt system of the seventh embodiment is arranged to vary the motor current for restricting the seat belt locking in accordance with a sensed vehicle surrounding condition such as a position of an obstacle, a type of an obstacle, and a road surface condition. The seat belt system of the seventh embodiment includes a surrounding condition sensor for sensing the vehicle surrounding condition.

When a distance to an obstacle is shorter, the vehicle deceleration tends to become greater, and hence the seat belt system is required to hold the occupant with a greater force. Therefore, the belt system of the seventh embodiment increases the motor current for the belt tension holding mode when an obstacle is closer to the vehicle or as the vehicle approaches an obstacle. The seat belt system decreases the motor current for the tension holding mode when the distance to an obstacle is greater or as the vehicle moves away from an obstacle.

On a road surface of a lower friction coefficient, the vehicle deceleration tends to be lower, and hence the impetus of movement of the occupant tends to be weaker. Therefore, the seat belt system of the seventh embodiment decreases the motor current for the tension holding mode when the sensed road surface friction is low.

The flowchart of FIG. 22 is different from FIG. 14 in the addition of steps S95 and S96 between S13 and S14. Step S95 is for sensing the vehicle surrounding condition, and S96 is for setting the motor current for the tension holding mode in accordance with the sensed vehicle surrounding condition.

When the belt retracting operation ends at the end of the predetermined time interval, CPU 109 proceeds from S13 to S95 and ascertains the vehicle surrounding condition sensed by the surrounding condition sensor. At next step S96, CPU 109 sets the motor current for the belt tension holding mode in accordance with the surrounding condition obtained at step S95. After S95 and S96, CPU 109 proceeds to step S14, and performs the belt tension holding operation by supplying, to motor 15, weak current set at a value determined at S96.

In this way, the seat belt system according to the seventh embodiment sets the motor current for the tension holding mode in dependence on the sensed vehicle surrounding condition. By so doing, the seat belt system can control the belt tension adequately in dependence on the surrounding condition such as a condition of an obstacle and a condition of a road surface, and at the same time prevent the overheating of the motor system.

Thus, by increasing the motor current in accordance with the vehicle surrounding condition, the seat belt system according to the seventh embodiment can lock the seat belt securely when the surrounding condition is adverse to the restraint. By decreasing the motor current in accordance with the vehicle surrounding condition, the seat belt system according to the seventh embodiment can control the belt tension adequately without causing an excessive restraint force to the belt wearer when the surrounding condition becomes stable. The seat belt system of the seventh embodiment can sense the vehicle surrounding condition properly by sensing the condition of an obstacle such as a preceding vehicle and the condition of a road.

Figure 23:
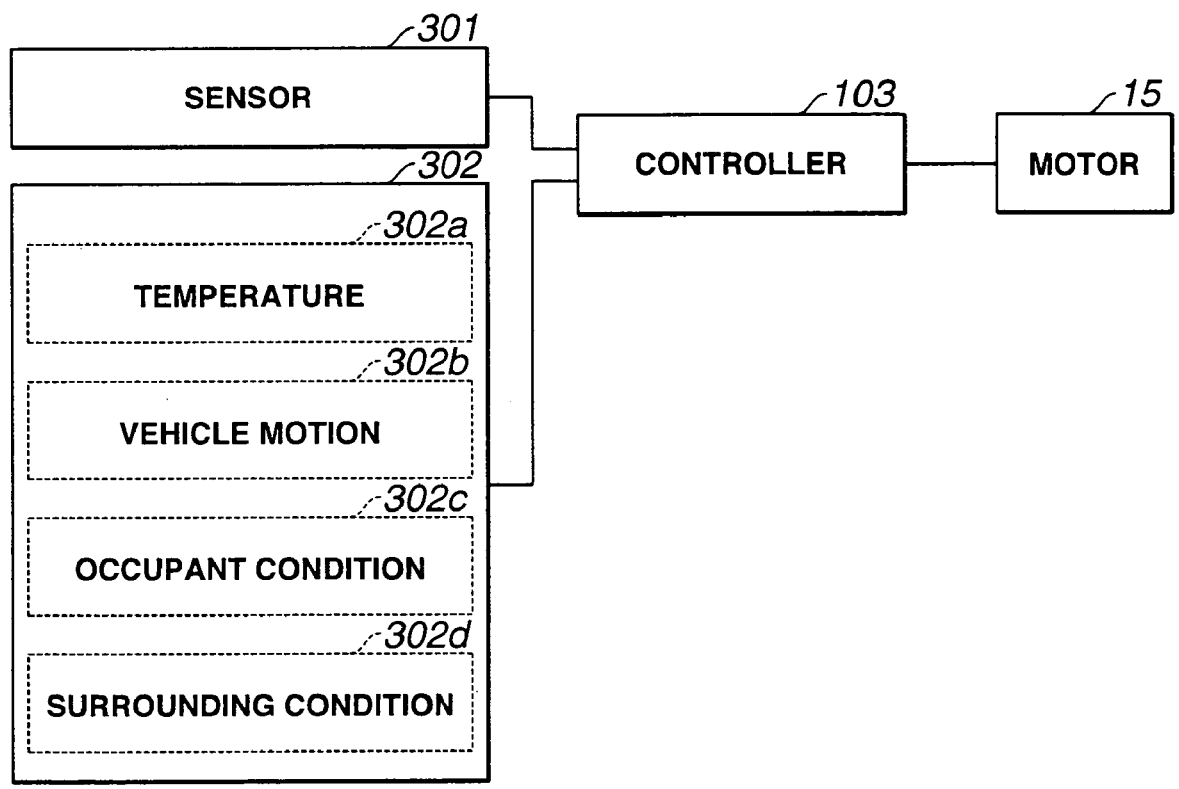
FIG. 23 is a block diagram showing a control system in the seat belt system according to one of the fourth to seventh embodiments.

FIG. 23 shows a control system which can be employed in any of the fourth, fifth, sixth and seventh embodiments. Controller 103 for controlling motor 15 is connected with a sensing section or input section for collecting information needed for the control. A sensor 301 is a sensor, such as longitudinal acceleration sensor 99, for sensing a possibility of a vehicle collision. A sensor 302 is a vehicle condition sensor which may include at least one of a temperature sensor 302a (as in the fourth embodiment), a vehicle motion sensor 302b (as in the fifth embodiment), an occupant condition sensor 302c (as in the sixth embodiment) and a surrounding condition sensor 302d (as in the seventh embodiment).

This application is based on a prior Japanese Patent Application No. 2003-276742 filed on Jul. 18, 2003. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle seat belt apparatus comprising:
   a reel to wind and store a seat belt;
   a motor to control a belt tension of the seat belt by rotating the reel;
   a lock section to allow rotation of the reel in a normal state, and to prevent rotation of the reel in a belt extracting direction in an actuated state; and
   a control section to restrict a lock operation of the lock section by rotating the motor in a belt retracting direction when the belt tension is controlled by the motor,
   wherein the control section is configured to control the motor in a belt retracting mode to retract the seat belt to restrain an occupant by driving the motor in the belt retracting direction to increase the belt tension to an increased level, and a belt tension holding mode to hold the belt tension at a decreased level lower than the increased level and thereby to restrict the lock section, by continuing to rotate the motor in the belt retracting direction after the belt retracting mode.

2. The vehicle seat belt apparatus as claimed in claim 1, wherein the control section is configured to control the belt tension by driving the motor on the occurrence of an excessive acceleration of a vehicle during one of a decelerating operation and a cornering operation of the vehicle.

3. The vehicle seat belt apparatus as claimed in claim 1, wherein the control section is configured to restrict the lock operation of the lock section by controlling a motor current supplied to the motor.

4. The vehicle seat belt apparatus as claimed in claim 3, wherein the control section is configured to restrict the lock operation of the lock section by controlling the motor current to such a current value as to make the belt tension lower than or equal to 100N.

5. The vehicle seat belt apparatus as claimed in claim 3, wherein the control section is configured to drive the motor for a predetermined time interval to retract the seat belt when a possibility of vehicle collision is detected, and to continue supplying the motor current to the motor after the end of the predetermined time interval until an end of a predetermined time period.

6. The vehicle seat belt apparatus as claimed in claim 3, wherein the control section is configured to drive the motor for a predetermined time interval to retract the seat belt when a possibility of vehicle collision is detected; to continue supply of the motor current to the motor after the end of the predetermined time interval; and to terminate the supply of the motor current to the motor when a temperature of a motor circuit including the motor and a drive circuit for driving the motor becomes higher than or equal to a predetermined temperature.

7. The vehicle seat belt apparatus as claimed in claim 3, wherein the control section comprises a condition sensor to sense a vehicle condition of the vehicle, and a controller to vary the motor current in accordance with the vehicle condition.

8. The vehicle seat belt apparatus as claimed in claim 7, wherein the control section is configured to increase the motor current in accordance with the vehicle condition.

9. The vehicle seat belt apparatus as claimed in claim 7, wherein the control section is configured to decrease the motor current in accordance with the vehicle condition.

10. The vehicle seat belt apparatus as claimed in claim 7, wherein the vehicle condition is a vehicle motion condition of the vehicle, and the condition sensor is a vehicle motion condition sensor to sense the vehicle motion condition of the vehicle.

11. The seat belt apparatus as claimed in claim 7, wherein the vehicle condition is a condition of an occupant in the vehicle, and the condition sensor is an occupant condition sensor to sense the condition of the occupant in the vehicle.

12. The vehicle seat belt apparatus as claimed in claim 10, wherein the vehicle motion condition sensor is arranged to sense one of a longitudinal acceleration of the vehicle and a turning condition of the vehicle.

13. The vehicle seat belt apparatus as claimed in claim 10, wherein the occupant condition sensor is arranged to sense one of a seating position, a posture and a physique of the occupant.

14. The seat belt apparatus as claimed in claim 7, wherein the vehicle condition is a vehicle surrounding condition of the vehicle, and the condition sensor is a surrounding condition sensor to sense the surrounding condition of the vehicle.

15. The vehicle seat belt apparatus as claimed in claim 14, wherein the surrounding condition sensor is arranged to sense one of a condition of an obstacle, and a condition of a road surface.

16. The vehicle seat belt apparatus as claimed in claim 1, wherein the control section is configured to control the motor first in the belt retracting mode and then in the belt tension holding mode consecutively when a possibility of an impact against an occupant is detected.

17. A vehicle seat belt apparatus comprising:
a reel to wind and store a seat belt;
a motor to control a belt tension of the seat belt by rotating the reel;
a lock section to allow rotation of the reel in a normal state, and to prevent rotation of the reel in a belt extracting direction in an actuated state; and
a control section to restrict a lock operation of the lock section by rotating the motor in a belt retracting direction when the belt tension is controlled by the motor,
wherein the control section is configured to restrict the lock operation of the lock section by controlling a motor current supplied to the motor,
wherein the control section is configured to drive the motor for a predetermined time interval to retract the seat belt when a possibility of vehicle collision is detected, and to continue supplying the motor current to the motor after the end of the predetermined time interval until the possibility of vehicle collision diminishes.

18. A vehicle seat belt apparatus comprising:
a reel to wind and store a seat belt;
a motor to control a belt tension of the seat belt by rotating the reel;
a lock section to allow rotation of the reel in a normal state, and to prevent rotation of the reel in a belt extracting direction in an actuated state; and
a control section to restrict a lock operation of the lock section by rotating the motor in a belt retracting direction when the belt tension is controlled by the motor,
wherein the control section is configured to restrict the lock operation of the lock section by controlling a motor current supplied to the motor,
wherein the control section is configured to drive the motor for a predetermined time interval to retract the seat belt when a possibility of vehicle collision is detected, and to continue supplying the motor current to the motor after the end of the predetermined time interval until an end of a predetermined time period,
wherein the control section is configured to vary the predetermined time period to continue supplying the motor current, in accordance with the motor current supplied to the motor.

19. A vehicle seat belt apparatus comprising:
a reel to wind and store a seat belt;
a motor to control a belt tension of the seat belt by rotating the reel;
a lock section to allow rotation of the reel in a normal state, and to prevent rotation of the reel in a belt extracting direction in an actuated state; and
a control section to restrict a lock operation of the lock section by rotating the motor in a belt retracting direction when the belt tension is controlled by the motor,
wherein the control section is configured to restrict the lock operation of the lock section by controlling a motor current supplied to the motor,
wherein the control section is configured to restrict the lock operation of the lock section by holding the motor current supplied to the motor constant.

20. A vehicle seat belt apparatus comprising:
a reel to wind and store a seat belt;
a motor to control a belt tension of the seat belt by rotating the reel;
a lock section to allow rotation of the reel in a normal state, and to prevent rotation of the reel in a belt extracting direction in an actuated state; and
a control section to restrict a lock operation of the lock section by rotating the motor in a belt retracting direction when the belt tension is controlled by the motor,
wherein the control section is configured to restrict the lock operation of the lock section by controlling a motor current supplied to the motor,
wherein the control section is configured to restrain the lock operation by supplying the motor current to the motor and by holding a voltage applied to the motor constant.

21. A vehicle seat belt apparatus comprising:
a reel to wind and store a seat belt;
a motor to control a belt tension of the seat belt by rotating the reel;
a lock section having an unlocked state to allow rotation of the reel and a lock state to prevent rotation of the reel in a belt extracting direction; and
a control section including,
a sensor section to detect a vehicle running state requiring restraint of an occupant in a vehicle, and
a controller to retract the seat belt automatically by supplying a motor current at a belt retracting current level to the motor when the vehicle running state requiring the restraint of the occupant is detected, and to continue supplying the motor current to the motor in a belt retracting direction by decreasing the motor current from the belt retracting current level to a belt tension holding current level to hold the belt tension.

22. A vehicle seat belt tension control method comprising:
detecting a vehicle running state requiring restraint of an occupant in a vehicle;
performing an automatic belt retracting operation to retract a seat belt to restrain the occupant when the vehicle running state requiring the restraint of the occupant is detected; and
holding a belt tension of the seat belt after the belt retracting operation by applying a force to the seat belt to retract the seat belt.

23. A vehicle seat belt apparatus comprising:
means for performing an automatic belt retracting operation by controlling a motor in a belt retracting mode to retract a seat belt automatically when a possibility of an impact is detected; and
means for holding a belt tension of the seat belt after the belt retracting operation by controlling the motor in a belt tension holding mode.

* * * * *